(12) United States Patent
Suzuki et al.

(10) Patent No.: US 12,736,138 B2
(45) Date of Patent: Sep. 15, 2026

(54) SLIDING COMPONENT

(71) Applicant: EAGLE INDUSTRY CO., LTD., Tokyo (JP)

(72) Inventors: Hiroshi Suzuki, Tokyo (JP); Hiroki Aizawa, Tokyo (JP); Tadatsugu Imura, Tokyo (JP); Yuta Negishi, Tokyo (JP); Nobuo Nakahara, Tokyo (JP); Takao Hishikawa, Tokyo (JP); Keita Kajihara, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 18 days.

(21) Appl. No.: 18/866,463

(22) PCT Filed: May 10, 2023

(86) PCT No.: PCT/JP2023/017593

§ 371 (c)(1),
(2) Date: Nov. 15, 2024

(87) PCT Pub. No.: WO2023/223914

PCT Pub. Date: Nov. 23, 2023

(65) Prior Publication Data

US 2025/0327480 A1 Oct. 23, 2025

(30) Foreign Application Priority Data

May 19, 2022 (JP) ................................ 2022-082112

(51) Int. Cl.
*F16J 15/34* (2006.01)
*F16C 17/04* (2006.01)

(52) U.S. Cl.
CPC ......... *F16J 15/3412* (2013.01); *F16J 15/342* (2013.01); *F16C 17/045* (2013.01); *F16J 15/3408* (2013.01)

(58) Field of Classification Search
CPC .... F16J 15/3408; F16J 15/3412; F16J 15/342; F16C 17/045
See application file for complete search history.

(56) References Cited

U.S. PATENT DOCUMENTS 3,085,808 A 4/1963 Williams ...................... 277/388
3,232,680 A 2/1966 Clark ........................... 384/110
(Continued)

FOREIGN PATENT DOCUMENTS

CN 2534429 2/2003 ............... F16J 15/40
CN 1492152 4/2004 ............ F04D 29/12
(Continued)

*Primary Examiner* — Nicholas L Foster
(74) *Attorney, Agent, or Firm* — HAYES SOLOWAY P.C.

(57) ABSTRACT

A sliding component has at least one of the sliding surfaces is provided with a plurality of forward dynamic pressure generation grooves each of which communicates with a leakage space, a forward fluid inlet/outlet groove which is separated from a forward dynamic pressure generation groove by a land and communicates with a sealed fluid space, and a backward fluid inlet/outlet groove which is separated from the forward dynamic pressure generation groove by the land and communicates with the sealed fluid space. The forward dynamic pressure generation grooves are disposed in a sparse state with respect to the backward fluid inlet/outlet groove than with respect to the forward fluid inlet/outlet groove.

20 Claims, 12 Drawing Sheets

(56) References Cited

U.S. PATENT DOCUMENTS

| | | | | |
|---|---|---|---|---|
| 3,376,083 | A | 4/1968 | Everhardus | F16H 33/102 |
| 3,410,565 | A | 11/1968 | Williams | 277/348 |
| 3,466,052 | A | 9/1969 | Ludwig | |
| 3,499,653 | A | 3/1970 | Gardner | 277/27 |
| 3,527,465 | A | 9/1970 | Guinard | 277/400 |
| 3,656,227 | A | 4/1972 | Weinand | 29/530 |
| 3,804,424 | A | 4/1974 | Gardner | 277/27 |
| 4,406,466 | A | 9/1983 | Geary, Jr. | 277/347 |
| 4,486,026 | A | 12/1984 | Furumura et al. | 277/80 |
| 5,092,612 | A | 3/1992 | Victor | 277/400 |
| 5,201,531 | A | 4/1993 | Lai | F16J 15/3412 |
| 5,222,743 | A | 6/1993 | Goldswain | 277/400 |
| 5,375,855 | A | 12/1994 | Goldswain et al. | |
| 5,398,943 | A | 3/1995 | Shimizu et al. | |
| 5,441,283 | A | 8/1995 | Pecht et al. | 277/96.1 |
| 5,447,316 | A | 9/1995 | Matsui | F16J 15/34 |
| 5,492,341 | A | 2/1996 | Pecht | 277/400 |
| 5,498,007 | A | 3/1996 | Kulkarni | 277/366 |
| 5,501,470 | A | 3/1996 | Fuse | 277/400 |
| 5,556,111 | A | 9/1996 | Sedy | 277/96.1 |
| 5,664,787 | A | 9/1997 | Fuse et al. | F16J 15/34 |
| 5,702,110 | A | 12/1997 | Sedy | |
| 5,895,051 | A | 4/1999 | Bowers | B62D 5/22 |
| 6,152,452 | A | 11/2000 | Wang | |
| 6,189,896 | B1 | 2/2001 | Dickey et al. | F16L 17/06 |
| 6,446,976 | B1 | 9/2002 | Key | 277/367 |
| 6,817,766 | B2 | 11/2004 | Gomyo | F16C 32/06 |
| 7,044,470 | B2 | 5/2006 | Zheng | F16J 15/3448 |
| 7,258,346 | B2 | 8/2007 | Tejima | F16J 15/3412 |
| 7,510,330 | B2 | 3/2009 | Obara | F16C 32/06 |
| 7,568,839 | B2 | 8/2009 | Gotoh et al. | F16C 32/06 |
| 7,758,051 | B2 | 7/2010 | Roberts-Haritonov et al. | F16J 15/34 |
| 8,814,433 | B2 | 8/2014 | Tokunga | F16C 33/741 |
| 9,062,775 | B2 | 6/2015 | Short et al. | F16J 15/34 |
| 9,279,455 | B2 | 3/2016 | Tokunga | F01D 25/168 |
| 9,291,200 | B2 | 3/2016 | Tokunga | F16C 33/74 |
| 9,353,865 | B2 | 5/2016 | Lattin | F16J 15/342 |
| 9,371,912 | B2 | 6/2016 | Hosoe et al. | F16J 15/34 |
| 9,470,267 | B2 | 10/2016 | Tokunaga | F16J 15/345 |
| 9,587,745 | B2 | 3/2017 | Itadani et al. | F16J 15/3412 |
| 9,611,938 | B1 | 4/2017 | Itadani et al. | F16J 15/34 |
| 9,677,670 | B2 | 6/2017 | Itadani et al. | F16J 15/34 |
| 9,765,892 | B2 | 9/2017 | Itadani et al. | F16J 15/34 |
| 9,829,109 | B2 | 11/2017 | Itadani et al. | F16J 15/3412 |
| 9,845,886 | B2 | 12/2017 | Itadani | F16C 33/72 |
| 9,850,953 | B2 | 12/2017 | Tokunga | F16J 25/186 |
| 9,951,873 | B2 | 4/2018 | Inoue et al. | F16J 15/34 |
| 9,982,784 | B2 | 5/2018 | Osada et al. | F16J 15/34 |
| 10,072,759 | B2 | 9/2018 | Inoue et al. | F16J 15/34 |
| 10,113,648 | B2 | 10/2018 | Inoue et al. | F16J 15/342 |
| 10,337,620 | B2 | 7/2019 | Tokunaga et al. | F16J 15/342 |
| 10,473,220 | B2 | 11/2019 | Tokunaga et al. | |
| 10,487,948 | B2 | 11/2019 | Inoue et al. | F16J 15/342 |
| 10,495,228 | B2 | 12/2019 | Itadani et al. | F16J 15/34 |
| 10,626,995 | B2 | 4/2020 | Itadani | F16J 15/34 |
| 10,704,417 | B2 | 7/2020 | Tokunaga et al. | F01D 25/16 |
| 10,781,924 | B2 | 9/2020 | Inoue et al. | F16J 15/342 |
| 10,883,603 | B2 | 1/2021 | Inoue et al. | F16J 15/342 |
| 10,883,604 | B2 | 1/2021 | Inoue et al. | F16J 15/342 |
| 11,009,072 | B2 | 5/2021 | Kimura et al. | F16J 15/34 |
| 11,009,130 | B2 | 5/2021 | Itadani | F16J 15/34 |
| 11,125,335 | B2 | 9/2021 | Kimura et al. | F16J 15/34 |
| 11,608,897 | B2 | 3/2023 | Okada et al. | |
| 11,644,100 | B2 * | 5/2023 | Kimura | F16J 15/342 277/579 |
| 11,739,844 | B2 | 8/2023 | Katori | F16J 15/34 |
| 11,821,521 | B2 | 11/2023 | Imura | F16J 15/342 |
| 11,852,241 | B2 * | 12/2023 | Suzuki | F16C 33/106 |
| 11,933,303 | B2 | 3/2024 | Suzuki | F16J 15/3412 |
| 12,188,516 | B2 | 1/2025 | Negishi et al. | |
| 12,209,668 | B2 * | 1/2025 | Imura | F16C 33/74 |
| 12,259,043 | B2 * | 3/2025 | Ou | F16C 33/107 |
| 12,404,936 | B2 * | 9/2025 | Imura | F16J 15/3412 |
| 12,473,946 | B2 * | 11/2025 | Fukuda | F16C 17/026 |
| 12,498,044 | B2 * | 12/2025 | Suzuki | F16J 15/3412 |
| 2002/0093141 | A1 | 7/2002 | Wang | 277/358 |
| 2003/0178781 | A1 | 9/2003 | Tejima | |
| 2004/0080112 | A1 | 4/2004 | Tejima | 277/306 |
| 2005/0141789 | A1 | 6/2005 | Kita et al. | F16C 32/06 |
| 2005/0212217 | A1 | 9/2005 | Tejima | 277/399 |
| 2005/0259898 | A1 | 11/2005 | Nii et al. | |
| 2007/0296156 | A1 | 12/2007 | Yanagisawa et al. | F16J 15/34 |
| 2008/0100001 | A1 | 5/2008 | Flaherty | 277/400 |
| 2008/0272552 | A1 | 11/2008 | Zheng | 277/400 |
| 2010/0066027 | A1 | 3/2010 | Vasagar | 277/350 |
| 2011/0101616 | A1 | 5/2011 | Teshima | 277/358 |
| 2012/0018957 | A1 | 1/2012 | Watanabe | 277/387 |
| 2013/0189294 | A1 | 7/2013 | Koelle et al. | F16J 15/34 |
| 2013/0209011 | A1 | 8/2013 | Tokunaga | F16C 32/0633 |
| 2015/0115537 | A1 | 4/2015 | Tokunaga | F16J 15/34 |
| 2015/0123350 | A1 | 5/2015 | Itadani | 277/400 |
| 2015/0184752 | A1 | 7/2015 | Itadani | F16J 15/3412 |
| 2015/0226334 | A1 | 8/2015 | Itadani | F16J 15/342 |
| 2015/0240950 | A1 | 8/2015 | Takahashi | F16J 15/363 |
| 2015/0260292 | A1 | 9/2015 | Inoue et al. | F16J 15/342 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/34 |
| 2016/0252182 | A1 | 9/2016 | Itadani et al. | F16J 15/34 |
| 2017/0198814 | A1 | 7/2017 | Colombo et al. | F16J 15/3412 |
| 2017/0234431 | A1 | 8/2017 | Katori et al. | F16J 15/3412 |
| 2017/0350407 | A1 | 12/2017 | Yamamoto | F16C 33/1045 |
| 2018/0073394 | A1 | 3/2018 | Tokunaga et al. | F01D 25/183 |
| 2018/0128377 | A1 | 5/2018 | Tokunaga et al. | F16J 15/342 |
| 2018/0128378 | A1 | 5/2018 | Tokunaga et al. | F16J 15/342 |
| 2019/0178386 | A1 | 6/2019 | Arai | F16J 15/3496 |
| 2019/0301522 | A1 | 10/2019 | Negishi et al. | F16C 17/026 |
| 2019/0316682 | A1 | 10/2019 | Negishi et al. | F16J 15/34 |
| 2019/0376558 | A1 * | 12/2019 | Kimura | F16C 33/743 |
| 2020/0182299 | A1 | 6/2020 | Kimura et al. | F16C 33/10 |
| 2020/0224768 | A1 | 7/2020 | Imura et al. | F16J 15/34 |
| 2021/0048062 | A1 | 2/2021 | Masumi | F16J 15/3412 |
| 2021/0116029 | A1 * | 4/2021 | Kimura | F16J 15/441 |
| 2021/0116030 | A1 * | 4/2021 | Kimura | F16J 15/182 |
| 2021/0355992 | A1 | 11/2021 | Tokunaga | F16C 17/10 |
| 2022/0056956 | A1 * | 2/2022 | Imura | F16J 15/3412 |
| 2022/0099188 | A1 * | 3/2022 | Imura | F16C 33/107 |
| 2022/0099189 | A1 * | 3/2022 | Suzuki | F16J 15/3412 |
| 2022/0120313 | A1 | 4/2022 | Ou | F16C 17/024 |
| 2022/0120315 | A1 | 4/2022 | Ou | |
| 2022/0128088 | A1 * | 4/2022 | Suzuki | F16J 15/3412 |
| 2023/0228292 | A1 | 7/2023 | Negishi | F16C 17/028 |
| 2023/0235780 | A1 | 7/2023 | Negishi et al. | |
| 2024/0209891 | A1 | 6/2024 | Uchida | F16J 15/3412 |
| 2024/0309910 | A1 * | 9/2024 | Fukuda | F16C 17/026 |
| 2024/0353007 | A1 * | 10/2024 | Yamaguchi | F16J 15/34 |
| 2025/0003495 | A1 * | 1/2025 | Onuma | F16C 17/045 |
| 2025/0003497 | A1 * | 1/2025 | Imura | F16J 15/3412 |
| 2025/0243903 | A1 * | 7/2025 | Suzuki | F16C 33/1015 |

FOREIGN PATENT DOCUMENTS

| | | | |
|---|---|---|---|
| CN | 101749431 | 6/2010 | F16J 15/34 |
| CN | 101776152 | 7/2010 | F16J 15/48 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 104919229 | 9/2015 | F16J 15/34 |
| CN | 105683632 | 6/2016 | F16J 15/34 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 108506494 | 9/2018 | F16J 15/34 |
| DE | 3619489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |

(56) References Cited

FOREIGN PATENT DOCUMENTS

| | | | |
|---|---|---|---|
| EP | 3091258 | 11/2016 | F16J 15/34 |
| EP | 3299686 | 3/2018 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S63-190975 | 8/1988 | F16J 15/34 |
| JP | H01133572 | 9/1989 | F16J 15/34 |
| JP | 2-236067 | 9/1990 | F16J 15/34 |
| JP | 3-14371 | 2/1991 | F16J 15/34 |
| JP | 3-35372 | 4/1991 | F16J 15/34 |
| JP | 3-41267 | 4/1991 | F16J 15/34 |
| JP | 3-41268 | 4/1991 | F16J 15/34 |
| JP | 3-108972 | 11/1991 | F16J 15/34 |
| JP | H04-73 | 1/1992 | F16J 15/34 |
| JP | H04-145267 | 5/1992 | F16J 15/34 |
| JP | H04-96671 | 8/1992 | F16J 15/34 |
| JP | H04337164 A2 | 11/1992 | |
| JP | H05-90048 | 12/1993 | F16J 15/34 |
| JP | H05-322050 | 12/1993 | F16J 15/34 |
| JP | 6-66374 | 3/1994 | F16J 15/34 |
| JP | H07-55016 | 3/1995 | F16J 15/34 |
| JP | H08-89489 | 4/1996 | A61B 5/05 |
| JP | H09-503276 | 3/1997 | F16J 15/34 |
| JP | H09-329247 | 12/1997 | F16J 15/34 |
| JP | H10-38093 | 2/1998 | F16J 15/34 |
| JP | H10-281299 | 10/1998 | F16J 15/34 |
| JP | 2000-179543 | 6/2000 | F16C 17/10 |
| JP | 2001-295833 | 10/2001 | F16C 17/04 |
| JP | 2001-317638 | 11/2001 | F16J 15/34 |
| JP | 2003-161322 | 6/2003 | F16C 33/10 |
| JP | 2003-343741 | 12/2003 | F16J 15/34 |
| JP | 2004-003578 | 1/2004 | F16J 15/34 |
| JP | 2005-180652 | 7/2005 | F16J 15/34 |
| JP | 2005-188651 | 7/2005 | F16J 15/34 |
| JP | 2005-58051 | 12/2005 | F16C 33/74 |
| JP | 2006-9828 | 1/2006 | F16C 17/02 |
| JP | 2006-022834 | 1/2006 | F16J 15/34 |
| JP | 2006-77899 | 3/2006 | F16J 15/34 |
| JP | 2008-144864 | 6/2008 | F16C 33/10 |
| JP | 2009-250378 | 10/2009 | F16J 15/34 |
| JP | 2010-133496 | 6/2010 | F16J 15/34 |
| JP | 2010-216587 | 9/2010 | F16J 15/34 |
| JP | 2011-185292 | 9/2011 | F16J 15/34 |
| JP | 2012-2295 | 1/2012 | F16J 15/34 |
| JP | 5271858 | 5/2013 | F16J 15/34 |
| JP | 2016-80090 | 5/2016 | F16J 15/34 |
| JP | 2017-141961 | 8/2017 | F16J 15/34 |
| JP | 6444492 | 12/2018 | F16J 15/34 |
| JP | 2019-15401 | 1/2019 | F16J 15/34 |
| JP | 2019-173953 | 10/2019 | F16J 15/34 |
| JP | 2020-173020 | 10/2020 | F16C 33/74 |
| WO | WO9506212 | 3/1995 | F16J 15/34 |
| WO | WO9506832 | 3/1995 | F16J 15/34 |
| WO | WO2012046749 | 4/2012 | F16J 15/34 |
| WO | WO2014024742 | 2/2014 | F16J 15/34 |
| WO | WO2014050920 | 4/2014 | F16J 15/34 |
| WO | WO2014103630 | 7/2014 | F16J 15/34 |
| WO | WO2014112455 | 7/2014 | F16J 15/34 |
| WO | WO2014148316 | 9/2014 | F16J 15/34 |
| WO | WO2014174725 | 10/2014 | F16J 15/34 |
| WO | WO2015199171 | 12/2015 | F16J 15/34 |
| WO | WO2016009408 | 1/2016 | F16J 15/34 |
| WO | WO2016035860 | 3/2016 | F16J 15/34 |
| WO | WO2016167262 | 10/2016 | F16J 15/34 |
| WO | WO2016186019 | 11/2016 | F16J 15/34 |
| WO | WO2016203878 | 12/2016 | F16J 15/34 |
| WO | WO2017002774 | 1/2017 | F16J 15/34 |
| WO | WO2017061406 | 4/2017 | F16J 15/34 |
| WO | WO2018034197 | 2/2018 | F16J 15/34 |
| WO | WO2018088353 | 5/2018 | F16J 15/34 |
| WO | WO2018105505 | 6/2018 | F16J 15/34 |
| WO | WO2018139231 | 8/2018 | F16J 15/34 |
| WO | WO2018139232 | 8/2018 | F16C 33/10 |
| WO | WO2019044671 | 3/2019 | F16C 17/04 |
| WO | WO2019069887 | 4/2019 | F16J 15/34 |
| WO | WO2020162025 | 12/2019 | F16C 17/04 |
| WO | WO2020032086 | 2/2020 | F16J 15/34 |
| WO | WO2020085122 | 4/2020 | F16J 15/34 |
| WO | WO-2021246372 A1 * | 12/2021 | F16C 17/045 |

* cited by examiner

ROTATION DIRECTION
OF MATING SEAL RING
S2(A)
S1(F)
10
11
12a
12b
12c
12d
16
17
18
18'
18a
18a'
131a
131b
131A
131Z
132a
132b
132A
132Z

ROTATION DIRECTION
OF MATING SEAL RING
S2(A)
132
131
12b
12d
26'
18'
17'
17
26
18
S1(F)

SLIDING COMPONENT

TECHNICAL FIELD

The present invention relates to a sliding component, for example, a sliding component including sliding rings that rotate relative to each other and are used for, for example, a shaft sealing device sealing a rotating shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device for preventing the leakage of a sealed fluid, for example, a mechanical seal includes a pair of annular sliding components which rotate relative to each other and slide on each other on their sliding surfaces. In such a mechanical seal, there has been a recent desire to reduce the energy lost through sliding for environmental measures or the like.

For example, in a mechanical seal shown in Patent Citation 1, a dynamic pressure generation groove and a fluid introduction groove are provided in a stationary seal ring. The dynamic pressure generation grooves extend in an arc shape with an inclination in a forward rotation direction of a rotating seal ring from starting ends toward the outer radial side and are arranged at equal intervals in the circumferential direction so that the starting ends communicate with a leakage side inner space. Further, the fluid introduction groove includes a fluid guide groove portion which communicates with an outer space and a Rayleigh step which circumferentially extends concentrically with the stationary seal ring from the inner radial side of the fluid guide groove portion in the forward rotation direction of the rotating seal ring. A sealed fluid exists in the outer space and atmosphere exists in the inner space.

When the rotating seal ring rotates forward at a low speed, the sliding surfaces are slightly separated from each other due to the positive pressure generated at and near the terminating end of the Rayleigh step of the fluid introduction groove. When the sealed fluid is allowed to flow therebetween, the sliding surfaces are lubricated and the wear between the sliding surfaces can be suppressed. Also, since the sealed fluid flowing between the sliding surfaces due to the positive pressure generated at the terminating end of the dynamic pressure generation groove is pushed back to the outer space side, the leakage of the sealed fluid from the space between the sliding surfaces to the inner space is suppressed. Further, when the rotating seal ring rotates forward at a high speed, the positive pressure generation capacity due to the entire dynamic pressure generation groove becomes larger than the positive pressure generation capacity due to the entire Rayleigh step and gas lubrication occurs.

In the sliding component of Patent Citation 1, lubricity is improved only during the forward rotation of the rotating seal ring, but there is also a mechanical seal in which the rotating seal ring rotates backward depending on the environment in use. In such a mechanical seal, it is required to improve lubricity during the backward rotation of the rotating seal ring. Therefore, it is conceived to further form a reverse Rayleigh step that circumferentially extends concentrically with the stationary seal ring from the inner radial side of the fluid guide groove portion of the fluid introduction groove in the backward rotation direction of the rotating seal ring (for example, see Patent Citation 2). Accordingly, when the rotating seal ring rotates backward, the sliding surfaces are lubricated by the sealed fluid flowing out from the terminating end of the reverse Rayleigh step into a space between the sliding surfaces and the wear between the sliding surfaces can be suppressed.

CITATION LIST

Patent Literature

Patent Citation 1: WO 2016/167262 A (Page 13, FIG. 7)
Patent Citation 2: WO 2020/162348 A (Page 8, FIG. 6)

SUMMARY OF INVENTION

Technical Problem

However, although the lubricity can be improved in any rotation direction in Patent Citation 2, the sealing performance during forward rotation is not sufficient. Therefore, when the fluid introduction groove having the reverse Rayleigh step shown in Patent Citation 2 is applied to Patent Citation 1, the dynamic pressure generation groove acts to push back the sealed fluid and hence the leakage during forward rotation can be reduced. On the other hand, the sealed fluid in the fluid introduction groove flowing out from the terminating end of the reverse Rayleigh step and the vicinity thereof is immediately drawn to the terminating end of the dynamic pressure generation groove during backward rotation and the pressure of the sealed fluid flowing out from the terminating end of the reverse Rayleigh step of the fluid introduction groove and the vicinity thereof is reduced. Accordingly, there is concern that a sufficient gap for allowing the sealed fluid to flow thereinto cannot be formed between the sliding surfaces.

The present invention has been made in view of such problems and an object of the present invention is to provide a sliding component having high sealing performance during relative forward rotation of a sliding component and capable of sufficiently lubricating sliding surfaces during relative backward rotation.

Solution to Problem

In order to solve the foregoing problem, a sliding component according to the present invention is a sliding component including a pair of sliding rings having sliding surfaces rotatable relative to each other to partition a sealed fluid space and a leakage space, wherein at least one of the sliding surfaces is provided with a plurality of forward dynamic pressure generation grooves each of which communicates with the leakage space, a forward fluid inlet/outlet groove which is separated from the forward dynamic pressure generation grooves by a first land portion and communicates with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparse state with respect to the backward fluid inlet/outlet groove than with respect to the forward fluid inlet/outlet groove. According to the aforesaid features of the present invention, since an interface, for example, a gas-liquid interface between the sealed fluid and the fluid of the leakage space is located on the sealed fluid space side during the relative forward rotation of the sliding component, the sealing performance is high. Further, since the forward dynamic pressure generation grooves are disposed in a sparse state with respect to the backward fluid inlet/outlet groove, the sealed fluid is difficult to flow from the backward fluid inlet/outlet groove to the forward dynamic pressure generation groove during the relative backward rotation of the sliding component. Accordingly, a pressure is easily generated at the terminating end of the backward fluid inlet/outlet groove and the land portion therearound, a sufficient gap for allowing the sealed fluid to flow thereinto can be formed between the sliding surfaces, and the sliding surfaces can be sufficiently lubricated.

It may be preferable that terminating ends of the forward dynamic pressure generation grooves are disposed in a sparse state with respect to a terminating end of the backward fluid inlet/outlet groove than with respect to a terminating end of the forward fluid inlet/outlet groove. According to this preferable configuration, since the influence due to the negative pressure generated at the terminating ends of the forward dynamic pressure generation grooves is small when a positive pressure is generated at the backward fluid inlet/outlet groove during relative backward rotation, a pressure is easily generated at the terminating end of the backward fluid inlet/outlet groove and the land therearound.

It may be preferable that the sparse state is configured such that part of the forward dynamic pressure generation grooves close to the backward fluid inlet/outlet groove have a smaller total volume than a total volume of part of the forward dynamic pressure generation grooves close to the forward fluid inlet/outlet groove. According to this preferable configuration, since the forward dynamic pressure generation grooves having a small total volume are disposed with respect to the backward fluid inlet/outlet groove, it is possible to reliably generate a dynamic pressure during relative forward rotation by generating a positive pressure using the forward dynamic pressure generation grooves and also to reliably prevent the leakage of the sealed fluid during relative forward rotation.

It may be preferable that the sparse state is configured such that part of the forward dynamic pressure generation grooves close to the backward fluid inlet/outlet groove have shorter radial lengths than radial lengths of part of the forward dynamic pressure generation grooves closed to the forward fluid inlet/outlet groove. According to this preferable configuration, since the forward dynamic pressure generation grooves having a short radial length is disposed with respect to the backward fluid inlet/outlet groove, it is possible to reliably generate a dynamic pressure during relative forward rotation by generating a positive pressure using the forward dynamic pressure generation grooves and also to reliably prevent the leakage of the sealed fluid during relative forward rotation.

It may be preferable that a plurality of sparse areas showing the space state are arranged in a circumferential direction of the one of the sliding surfaces. According to this preferable configuration, a pressure is easily generated at the land portion near the backward fluid inlet/outlet grooves at a plurality of positions in the circumferential direction of the sliding surface during relative backward rotation and the sliding surfaces can be sufficiently lubricated.

It may be preferable that each of the forward dynamic pressure generation grooves is a spiral groove extending from a starting end in an arc shape with an inclination with respect to a radial direction, the forward fluid inlet/outlet groove includes a fluid guide groove portion communicating with the sealed fluid space and a Rayleigh step extending in a relative forward rotation direction, and the backward fluid inlet/outlet groove includes a fluid guide groove portion communicating with the sealed fluid space and a reverse Rayleigh step extending in a relative backward rotation direction. According to this preferable configuration, since the forward dynamic pressure generation groove is a spiral groove, it is possible to efficiently generate a positive pressure at the terminating end using a fluid on the leakage space side, for example, a gas. Further, since the Rayleigh step and the reverse Rayleigh step extend in the relative forward rotation direction or the relative backward rotation direction, most of the sealed fluid flows out in the circumferential direction from the terminating end of the Rayleigh step or the terminating end of the reverse Rayleigh step during relative forward rotation and during relative backward rotation and hence the sealed fluid is difficult to be drawn from the terminating end of the forward dynamic pressure generation groove.

It may be preferable that the forward fluid inlet/outlet groove and the backward fluid inlet/outlet groove as a whole have a substantially T shape and share a groove as the fluid guide groove portions thereof. According to this preferable configuration, since the sealed fluid in the Rayleigh step on the other side when a positive pressure is generated on one side can be used in addition to the sealed fluid in the fluid guide groove portion in both forward rotation and backward rotation and a positive pressure can be efficiently generated by using a sufficient amount of the sealed fluid.

It may be preferable that the forward fluid inlet/outlet groove is disposed on a relative backward rotation direction side of the backward fluid inlet/outlet groove. According to this preferable configuration, a part of the sealed fluid flowing from the terminating end of the backward fluid inlet/outlet groove into a space between the sliding surfaces is sucked and collected from the terminating end of the backward fluid inlet/outlet groove adjacent thereto in the rotation direction and is difficult to leak to the outer space which is the leakage space.

Further, the sealed fluid may be a gas or liquid, or may be a mist mixture of liquid and gas.

DESCRIPTION OF EMBODIMENTS

Figure 1:
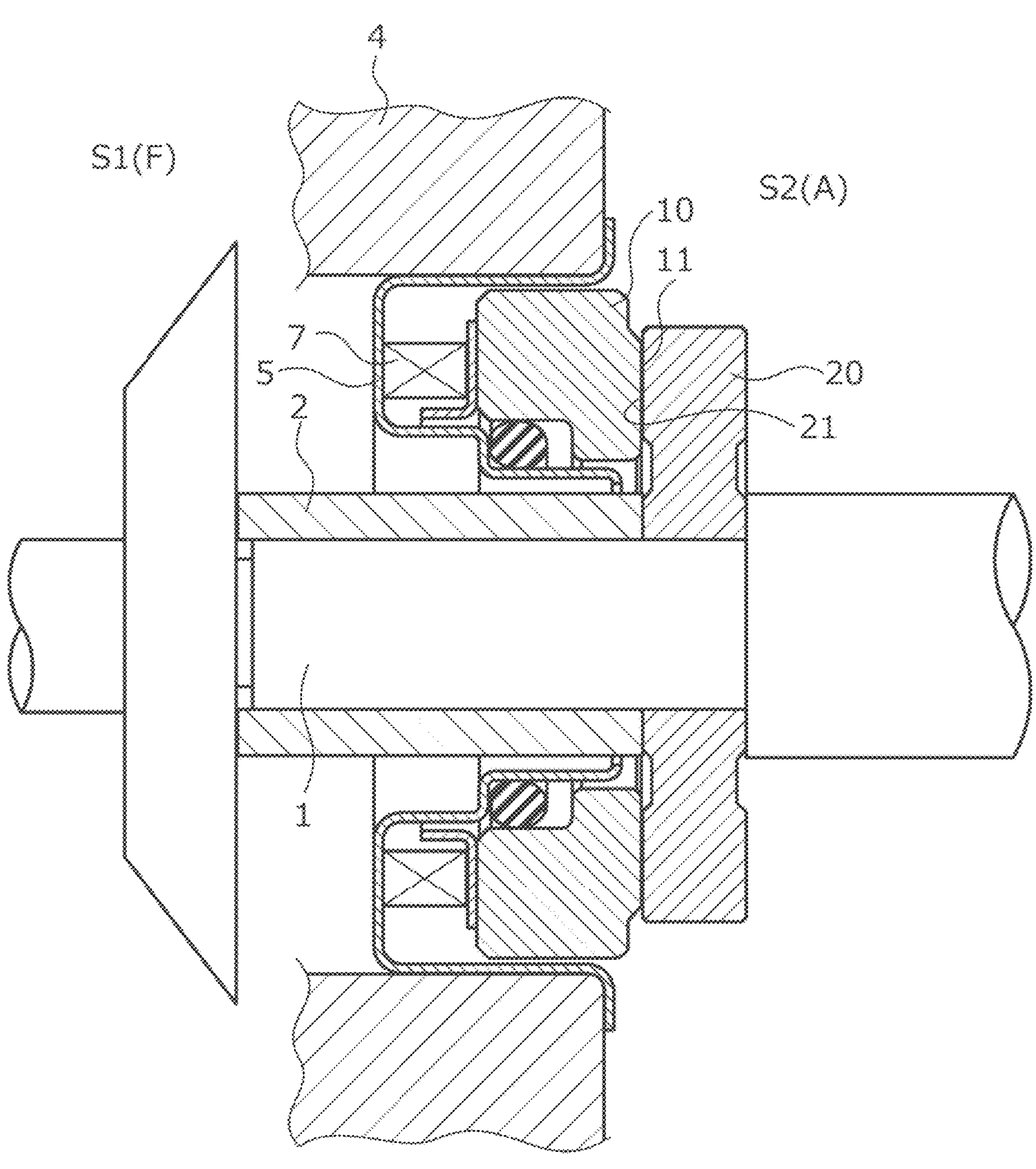
FIG. 1 is a longitudinal sectional view showing an example of a mechanical seal as a sliding component according to a first embodiment of the present invention.

Modes for carrying out a sliding component according to the present invention will be described on the basis of the embodiments.

First Embodiment

A sliding component according to a first embodiment of the present invention will be described with reference to FIGS. 1 to 5. Furthermore, in this embodiment, an example in which the sliding component is a mechanical seal will be described. Further, a description will be made on the assumption that sealed fluid exists in an inner space of the mechanical seal, atmosphere exists in an outer space thereof, an inner radial side of the sliding component constituting the mechanical seal is a sealed fluid side (high pressure side), and an outer radial side thereof is a leakage side (low pressure side). Further, for convenience of description, dots may be added to grooves formed on the sliding surface in the drawings.

The mechanical seal for automobiles shown in FIG. 1 is of an outside type in which a sealed fluid F that attempts to leak from the inner radial side of the sliding surface toward the outer radial side thereof is sealed and an outer space S2 is communicated with an atmosphere A. Furthermore, in this embodiment, a configuration is exemplified in which the sealed fluid F is a high-pressure liquid and the atmosphere A is a gas with a lower pressure than the sealed fluid F.

The mechanical seal mainly includes a rotating seal ring 20 which is another annular sliding component and a stationary seal ring 10 which is an annular sliding component. The rotating seal ring 20 is provided in a rotating shaft 1 to be rotatable together with the rotating shaft 1 via a sleeve 2. The stationary seal ring 10 is provided in a non-rotating state and in an axially movable state on a seal cover 5 fixed to a housing 4 of an attached device. The stationary seal ring 10 is axially biased by an elastic member 7 and a sliding surface 11 of the stationary seal ring 10 and a sliding surface 21 of the rotating seal ring 20 closely slide against each other. Furthermore, the sliding surface 21 of the rotating seal ring 20 is a flat surface, and this flat surface is not provided with any recess such as a groove.

The stationary seal ring 10 and the rotating seal ring 20 are typically made of SiC (as an example of hard material) or a combination of SiC and carbon (as an example of soft material). However, any sliding material can be applied insofar as it is used as a sliding material for a mechanical seal. Furthermore, the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
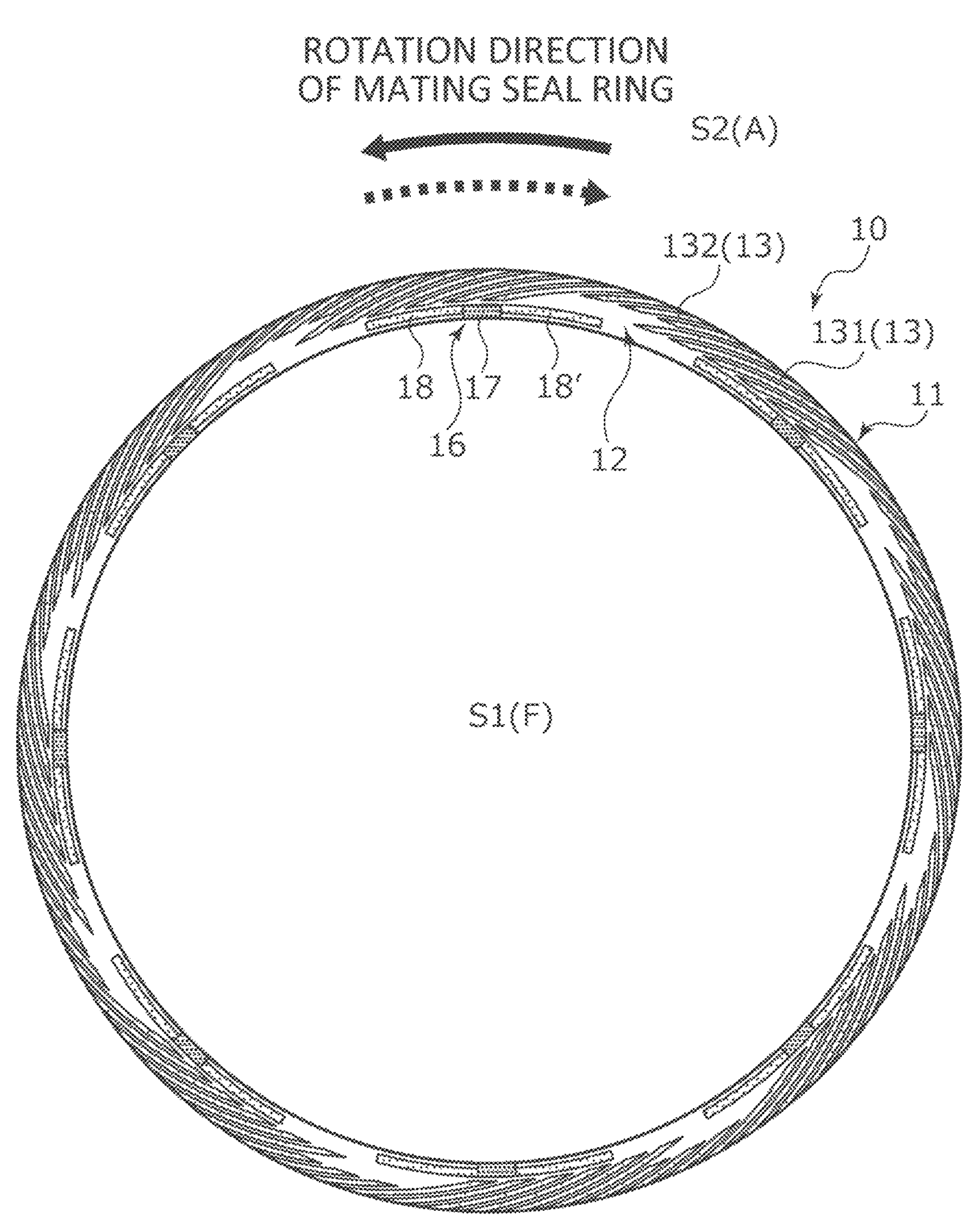
FIG. 2 is a diagram of a sliding surface of a stationary seal ring of the first embodiment when viewed from the axial direction.
Figure 3:
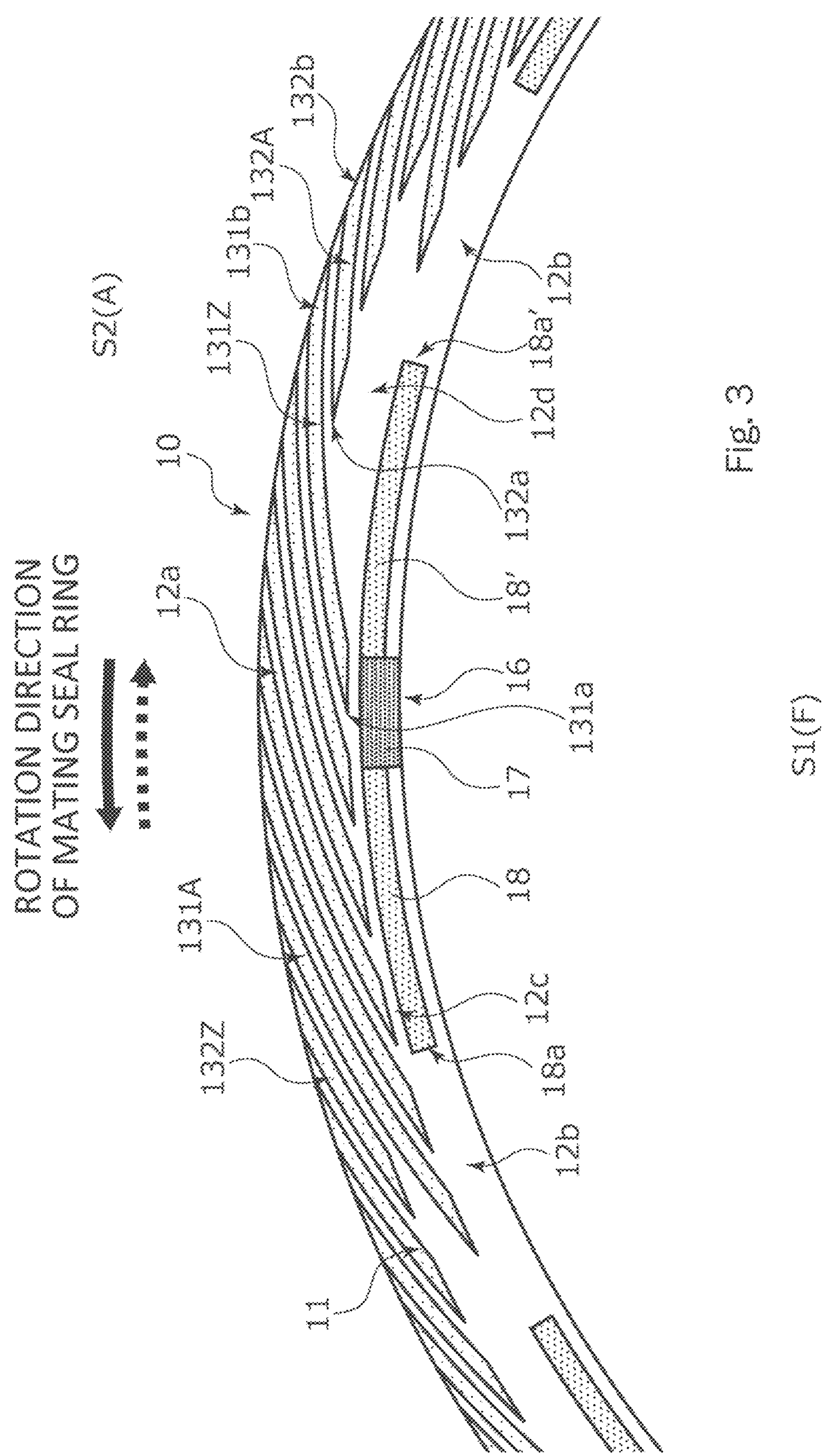
FIG. 3 is an enlarged view of the sliding surface of the stationary seal ring of the first embodiment when viewed from the axial direction.

As shown in FIGS. 2 and 3, the rotating seal ring 20, which is the mating seal ring, is configured to slide relative to the stationary seal ring 10 counterclockwise as indicated by the solid arrow or clockwise as indicated by the dotted arrow, respectively. Hereinafter, the rotation direction indicated by the solid arrow will be described as the forward rotation direction, and the rotation direction indicated by the dotted arrow will be described as the backward rotation direction.

On the sliding surface 11 of the stationary seal ring 10, a plurality of dynamic pressure generation grooves 13 are arranged evenly in the circumferential direction on the outer radial side and a plurality of fluid introduction grooves 16 are arranged evenly in the circumferential direction on the inner radial side as a plurality of fluid inlet/outlet grooves. In this embodiment, the fluid introduction groove 16 has a function of introducing fluid, but may also be used to derive fluid.

Further, the portion of the sliding surface 11 other than the dynamic pressure generation groove 13 and the fluid introduction groove 16 is a land 12 that is a flat surface (see FIG. 2). Specifically, as shown in FIG. 3, the land 12 includes a land portion 12*a* which is between the dynamic pressure generation grooves 13 adjacent to each other in the circumferential direction, a land portion 12*b* which is between the fluid introduction grooves 16 adjacent to each other in the circumferential direction, and land portions 12*c* and 12*d* to be described later and the upper surface (that is, the axial end surface) of each of these land portions is arranged on the same plane and constitutes a flat surface of the land 12.

As shown in FIG. 2, the starting end of the dynamic pressure generation groove 13 communicates with the outer space S2 and extends in an arc shape with an inclination from the starting end toward the inner radial side in the forward rotation direction of the rotating seal ring 20. The dynamic pressure generation groove 13 is a forward dynamic pressure generation groove which generates a positive pressure at the terminating end during the forward rotation of the rotating seal ring 20.

The dynamic pressure generation groove 13 includes a first dynamic pressure generation groove 131 which is relatively long in the radial direction and of which a terminating end 131*a* (see FIG. 3) is closer to the fluid introduction groove 16 and a second dynamic pressure generation groove 132 which is shorter than the first dynamic pressure generation groove 131 in the radial direction and of which a terminating end 132*a* (see FIG. 3) is further away from the fluid introduction groove 16.

A predetermined number of the first dynamic pressure generation grooves 131 and the second dynamic pressure generation grooves 132 constitute a first dynamic pressure generation groove group and a second dynamic pressure generation groove group, respectively. In this embodiment, the first dynamic pressure generation groove group is composed of six first dynamic pressure generation grooves 131 in the circumferential direction, the second dynamic pressure generation groove group is composed of three second dynamic pressure generation grooves 132 in the circumferential direction, and the first dynamic pressure generation groove group and the second dynamic pressure generation groove group are alternately provided.

Furthermore, the first dynamic pressure generation groove 131 and the second dynamic pressure generation groove 132 which are adjacent to each other are separated by the same distance as the separation distance between the first dynamic pressure generation grooves 131 in the circumferential direction and the separation distance between the second dynamic pressure generation grooves 132 in the circumferential direction. That is, the first dynamic pressure generation grooves 131 and the second dynamic pressure generation grooves 132 are all arranged equally in the circumferential direction, that is, at equal pitches, but the present invention is not limited thereto. For example, the first dynamic pressure generation groove 131 and the second dynamic pressure generation groove 132 which are adjacent to each other may be separated by different distances from the separation distance between the first dynamic pressure generation grooves 131 in the circumferential direction and the separation distance between the second dynamic pressure generation grooves 132 in the circumferential direction.

Furthermore, the dynamic pressure generation groove 13 is not limited to extending in an arc shape with an inclination in the forward rotation direction of the rotating seal ring 20, but may also extend in a straight line with an inclination in the forward rotation direction of the rotating seal ring 20.

As shown in FIG. 3, the fluid introduction groove 16 includes a fluid guide groove portion 17 which communicates with an inner space S1 and a Rayleigh step 18 and a reverse Rayleigh step 18' which serve as dynamic pressure generation portions extending in the circumferential direction concentrically with the stationary seal ring 10 from the outer radial side of the fluid guide groove portion 17 in the forward rotation direction or the backward rotation direction of the rotating seal ring 20.

Furthermore, the fluid guide groove portion 17 is formed to be deeper than the depth dimension of the dynamic pressure generation groove 13. Further, the Rayleigh step 18 and the reverse Rayleigh step 18' are formed to be shallower than the depth dimension of the fluid guide groove portion 17 and to be substantially the same as the depth dimension of the dynamic pressure generation groove 13. Furthermore, the fluid guide groove portion 17 may have the same depth dimension as that of the dynamic pressure generation groove 13. Further, the Rayleigh step 18 and the reverse Rayleigh step 18' are formed to have a circumferential length longer than the circumferential length of the fluid guide groove portion 17 or the circumferential length of one dynamic pressure generation groove 13.

The Rayleigh step 18 circumferentially extends concentrically with the stationary seal ring 10 in the forward rotation direction of the rotating seal ring 20 and constitutes a forward fluid inlet/outlet groove together with the fluid guide groove portion 17. The reverse Rayleigh step 18' circumferentially extends concentrically with the stationary seal ring 10 in the backward rotation direction of the rotating seal ring 20 and constitutes a backward fluid inlet/outlet groove together with the fluid guide groove portion 17.

Further, the fluid introduction grooves 16 are arranged to straddle the first dynamic pressure generation groove group and the second dynamic pressure generation groove group on the inner radial side. In other words, the fluid introduction grooves are arranged to face each other in the radial direction. Specifically, among the first dynamic pressure generation grooves 131 constituting the first dynamic pressure generation groove group, the rearmost end adjacent to the second dynamic pressure generation groove 132, that is, the terminating end 131*a* of the first dynamic pressure generation groove 131Z at the upstream end in the forward rotation direction faces the fluid guide groove portion 17 of the fluid introduction groove 16. In other words, the fluid guide groove portion 17 is located in the extending direction of the terminating end 131*a* of the first dynamic pressure generation groove 131Z at the rearmost end.

Among the first dynamic pressure generation grooves 131 constituting the first dynamic pressure generation groove group, the terminating end 131*a* of the first dynamic pressure generation groove 131A at the frontmost end is located slightly on the outer radial side of the land portion 12*b* between the fluid introduction grooves 16 adjacent to each other in the circumferential direction. Then, the first dynamic pressure generation grooves 131 constituting the first dynamic pressure generation groove group are all formed toward the fluid guide groove portion 17, the Rayleigh step 18, and the land portion 12*b* between the fluid introduction grooves 16 adjacent to each other in the circumferential direction and do not face the reverse Rayleigh step 18'. In other words, the reverse Rayleigh step 18' is not located in the extending direction of the terminating end 131*a* of the first dynamic pressure generation groove 131Z at the rearmost end.

On the other hand, among the second dynamic pressure generation grooves 132 constituting the second dynamic pressure generation groove group, the terminating end 132*a* of the second dynamic pressure generation groove 132A located at the frontmost end and adjacent to the first dynamic pressure generation groove 131 faces the reverse Rayleigh step 18' of the fluid introduction groove 16. In other words, the reverse Rayleigh step 18' is located in the extending direction of the terminating end 132*a* of the second dynamic pressure generation groove 132A at the frontmost end. Further, among the second dynamic pressure generation grooves 132 constituting the second dynamic pressure generation groove group, the terminating end 132*a* of the second dynamic pressure generation groove 132Z at the rearmost end is also away from the first dynamic pressure generation groove 131 in the radial direction and faces the reverse Rayleigh step 18' of the fluid introduction groove 16. That is, all of the second dynamic pressure generation grooves 132 constituting the second dynamic pressure generation groove group face only the reverse Rayleigh step 18'. In other words, in all of the second dynamic pressure generation grooves 132, only the reverse Rayleigh step 18' is located in the extending direction.

In this way, the land portion 12*d* between the second dynamic pressure generation groove 132 facing the reverse Rayleigh step 18' and the reverse Rayleigh step is longer than the land portion 12*c* between the Rayleigh step 18 and the fluid guide groove portion 17 and the first dynamic pressure generation groove 131 facing these in the radial direction.

As shown in FIG. 3, in the dynamic pressure generation groove 13, the terminating ends 131*a* of four first dynamic pressure generation grooves 131 are closely arranged close to the Rayleigh step 18 and the fluid guide groove portion 17 via the land portion 12*c* and in contrast, the terminating ends 132*a* of three second dynamic pressure generation grooves

132 are arranged away from the reverse Rayleigh step 18' via the land portion **12*d*** in a sparse state.

Furthermore, the sparse state mentioned herein indicates a state in which the ratio of the area on the sliding surface 11 where the dynamic pressure generation grooves 13 are arranged particularly around the terminating end **18*a*' of the reverse Rayleigh step 18' is smaller than the ratio of the area where the dynamic pressure generation grooves 13 are arranged particularly around the terminating end 18*a* of the Rayleigh step 18. Further, it can be said that the total volume of the dynamic pressure generation grooves 13, that is, the second dynamic pressure generation grooves 132 particularly arranged around the terminating end 18*a*' of the reverse Rayleigh step 18' is smaller than the total volume of the dynamic pressure generation grooves 13, that is, the first dynamic pressure generation grooves 131 particularly arranged around the terminating end 18*a* of the Rayleigh step 18. In this embodiment, the second dynamic pressure generation grooves 132 are all away from the reverse Rayleigh step 18' by a long distance particularly in the radial direction and in contrast, the first dynamic pressure generation grooves 131 are all away from, that is, close to the Rayleigh step 18 by a short distance in the radial direction. Furthermore, although it will be described later in detail using another example, even the state shown in FIG. 6 in which the second dynamic pressure generation grooves 132 are not arranged at all particularly around the terminating end 18*a*' of the reverse Rayleigh step 18' can be mentioned as the sparse state compared to the state of the dynamic pressure generation grooves 13 in which the dynamic pressure generation grooves 13 arranged particularly around the terminating end 18*a*' of the reverse Rayleigh step 18' are arranged particularly around the terminating end 18*a* of the Rayleigh step 18**.

Next, the operation during the relative rotation between the stationary seal ring 10 and the rotating seal ring 20 will be described with reference to FIGS. 4 and 5. Furthermore, in this embodiment, the rotating seal ring 20 will be described in the order of the stop state, the forward rotation state, and the backward rotation state.

First, the sealed fluid F flows into the fluid introduction groove 16 in the stop state in which the rotating seal ring 20 does not rotate. Furthermore, since the stationary seal ring 10 is biased toward the rotating seal ring 20 by the elastic member 7, the sliding surfaces 11 and 21 are in the contact state and almost no amount of the sealed fluid F between the sliding surfaces 11 and 21 leaks into the outer space S2.

Figure 4:
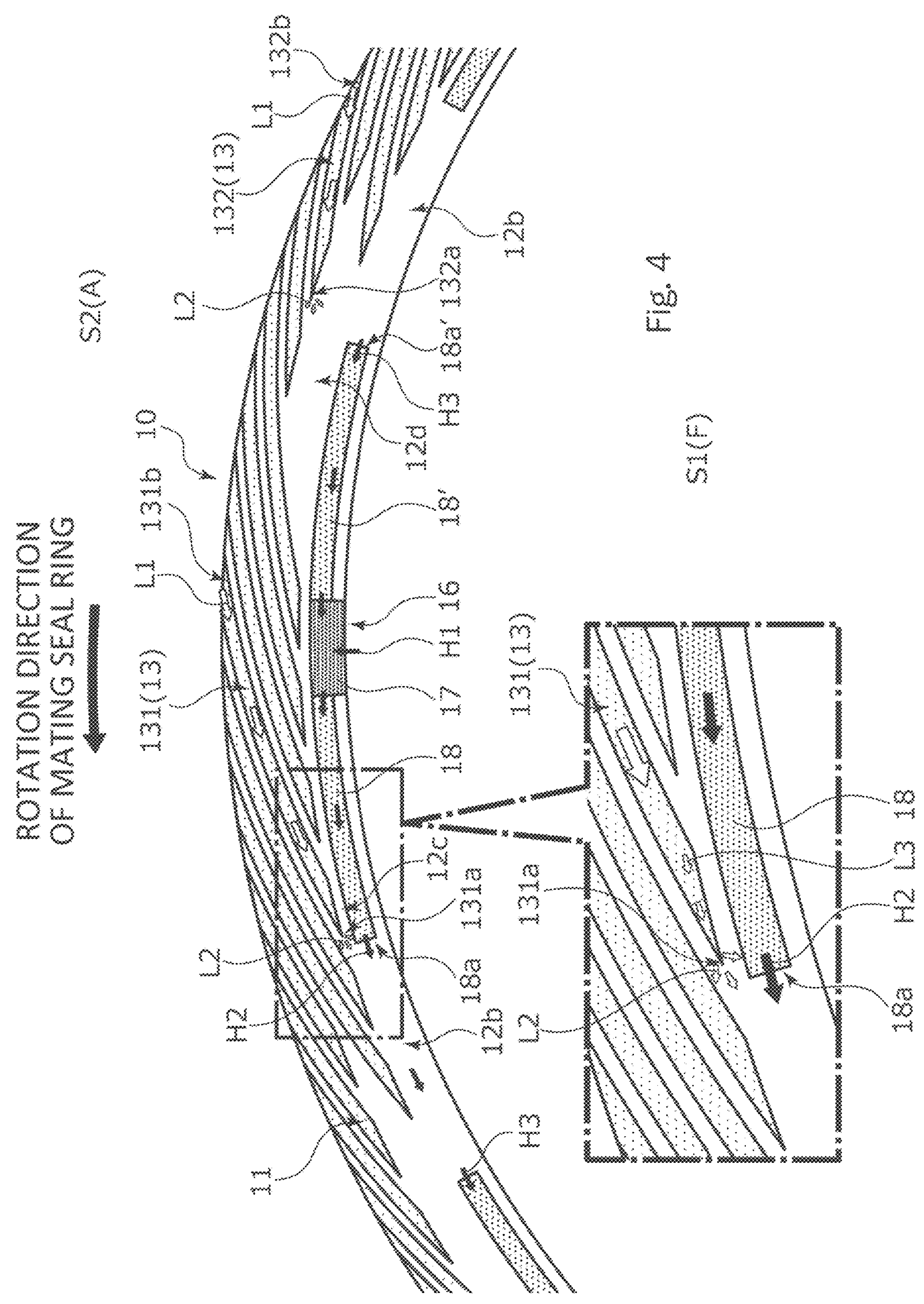
FIG. 4 is an explanatory diagram showing the movement of fluid in a dynamic pressure generation groove and a fluid introduction groove during forward rotation on the sliding surface of the stationary seal ring of the first embodiment when viewed from the axial direction.
Figure 5:
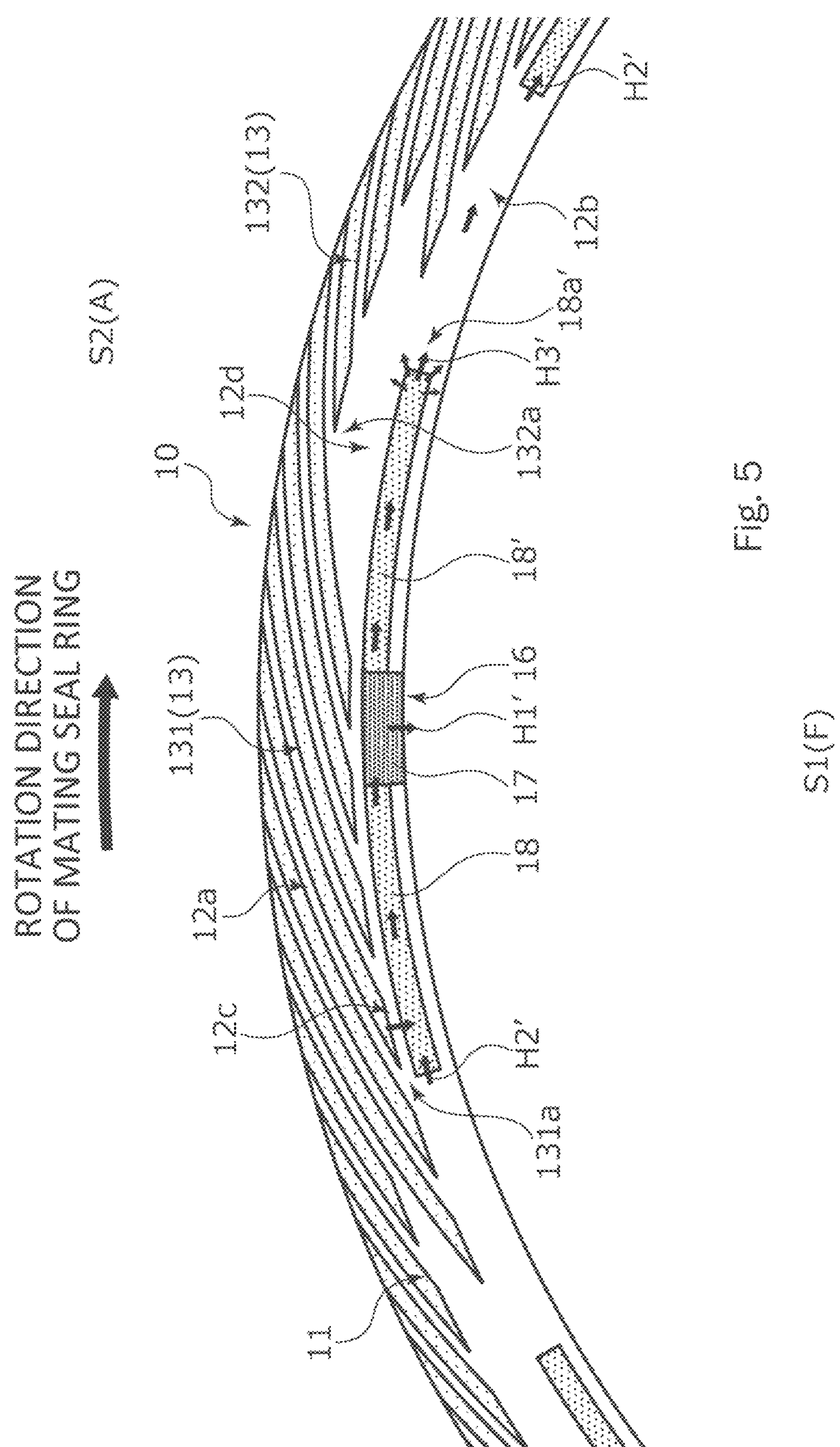
FIG. 5 is an explanatory diagram showing the movement of fluid in the dynamic pressure generation groove and the fluid introduction groove during backward rotation on the sliding surface of the stationary seal ring of the first embodiment when viewed from the axial direction.

As shown in FIG. 4, since the sealed fluid F in the Rayleigh step 18 follows and moves in the forward rotation direction of the rotating seal ring 20 due to shearing with the sliding surface 21 at low speed immediately after the rotating seal ring 20 starts to rotate in the forward rotation direction relative to the stationary seal ring 10, the sealed fluid F of the inner space S1 is drawn into the fluid guide groove portion 17.

That is, in the fluid introduction groove 16, the sealed fluid F moves from the fluid guide groove portion 17 toward the terminating end **18*a* on the downstream side in the relative rotation direction of the Rayleigh step 18 as indicated by the arrow H1 and a force acts in the fluid guide groove portion 17 to draw the sealed fluid F as indicated by the arrow H1. Furthermore, the flow of the sealed fluid F or the atmosphere A in FIG. 4 is schematically shown without specifying the relative rotation speed of the rotating seal ring 20**.

The pressure of the sealed fluid F having moved toward the terminating end **18*a* of the Rayleigh step 18 is increased at and near the terminating end 18*a* of the Rayleigh step 18. That is, a positive pressure is generated at and near the terminating end 18*a* of the Rayleigh step 18**.

Since the depth of the Rayleigh step 18 is shallow, a positive pressure is generated at and near the terminating end **18*a* of the Rayleigh step 18 even when the movement amount of the sealed fluid F is small at the low rotation speed of the rotating seal ring 20**.

Further, the sliding surfaces 11 and 21 are slightly separated from each other by a force due to the positive pressure generated at and near the terminating end **18*a* of the Rayleigh step 18. Accordingly, the sealed fluid F flows from the terminating end 18*a* of the Rayleigh step 18 and the inner space S1 into a space between the sliding surfaces 11 and 21. In this way, since the sealed fluid F is interposed between the sliding surfaces 11 and 21, lubricity is improved even during low-speed rotation, and wear between the sliding surfaces 11 and 21** can be suppressed.

Further, since the sealed fluid F in the reverse Rayleigh step 18' follows and moves in the forward rotation direction of the rotating seal ring 20 due to shearing with the sliding surface 21 at low speed immediately after the rotating seal ring 20 starts to rotate in the forward rotation direction relative to the stationary seal ring 10, a relative negative pressure is generated at and near the terminating end **18*a*' of the reverse Rayleigh step 18'. Therefore, a part of the sealed fluid F flowing out from the terminating end 18*a* of the Rayleigh step 18 into a space between the sliding surfaces 11 and 21 as indicated by the arrow H2 is sucked and collected from the terminating end 18*a*' of the adjacent downstream reverse Rayleigh step 18' as indicated by the arrow H3 via the land portion 12*b*. Further, the sealed fluid F enters the fluid guide groove portion 17 from the reverse Rayleigh step 18' and a force acts in the fluid guide groove portion 17 to push out a part of the sealed fluid F into the inner space S1**.

On the other hand, in the dynamic pressure generation groove 13, when the relative rotation speed between the rotating seal ring 20 and the stationary seal ring 10 is low, the atmosphere A is not sufficiently dense in the dynamic pressure generation groove 13 and high positive pressure is not generated. Then, a force due to the positive pressure generated at the dynamic pressure generation groove 13 is relatively smaller than the force due to the positive pressure generated at and near the terminating end **18*a* of the Rayleigh step 18. Thus, when the rotating seal ring 20 rotates at a low speed, the sliding surfaces 11 and 21 are separated from each other mainly by the force due to the positive pressure generated at and near the terminating end 18*a* of the Rayleigh step 18**.

When the relative rotation speed of the rotating seal ring 20 increases, as shown in FIG. 4, the atmosphere A in the dynamic pressure generation groove 13 follows and moves in the forward rotation direction of the rotating seal ring 20 due to shearing with the sliding surface 21 and the atmosphere A of the outer space S2 is drawn into the dynamic pressure generation groove 13. That is, a large amount of atmosphere A moves from the starting ends **131*b* and 132*b* toward the terminating ends 131*a* and 132*a* as indicated by the arrow L1 in the first dynamic pressure generation groove 131 and the second dynamic pressure generation groove 132 and a positive pressure is generated at and near the terminating ends 131*a* and 132*a***.

In this way, a force due to the positive pressure generated at and near the terminating ends **131*a* and 132*a* of the dynamic pressure generation groove 13 is added to the force due to the positive pressure generated at and near the terminating end 18*a* of the Rayleigh step 18 and the sliding surfaces 11 and 21 are further separated from each other compared to when the speed is low. Accordingly, the atmosphere A in the dynamic pressure generation groove 13 flows into a space between the sliding surfaces 11 and 21 mainly indicated by the arrow L2**.

At this time, the atmosphere A mixed with the sealed fluid F as indicated by the arrow L3 in the dynamic pressure generation groove 13 is pushed out from the terminating ends 131*a* and 132*a* and the vicinity thereof toward the inner radial side, that is, toward the sealed fluid F due to the atmosphere A having high energy such as flow velocity as indicated by the arrow L1.

Since the positive pressure generation capacity of the entire dynamic pressure generation groove 13 is designed to be sufficiently larger than the positive pressure generation capacity of the entire fluid introduction groove 16 when the sliding component of this embodiment rotates at a high speed in the forward rotation direction, finally, only the atmosphere A exists between the sliding surfaces 11 and 21, that is, gas lubrication occurs.

In this way, when the rotating seal ring 20 starts to rotate relative to the stationary seal ring 10 in the forward rotation direction, the sliding surfaces 11 and 21 are lubricated by the sealed fluid F flowing out from the fluid introduction groove 16 into a space between the sliding surfaces 11 and 21. Then, when the rotating seal ring rotates at a high speed, the sliding surfaces 11 and 21 are separated from each other by the positive pressure generated by the atmosphere A in the dynamic pressure generation groove 13, the sealed fluid F and the atmosphere A are introduced into a space between the sliding surfaces 11 and 21 to improve lubricity. Accordingly, it is possible to suppress the wear between the sliding surfaces 11 and 21 from the start of relative rotation to high speed rotation. Further, since the dynamic pressure generation groove 13 extends to the inner space S1 which is the sealed fluid space and a gas-liquid interface is located on the sealed fluid space side, the sealed fluid F is difficult to leak.

Next, the backward rotation of the rotating seal ring 20 will be described with reference to FIG. 5. As shown in FIG. 5, when the rotating seal ring 20 rotates relative to the stationary seal ring 10 in the backward rotation direction, the sealed fluid F in the Rayleigh step 18 follows and moves in the backward rotation direction of the rotating seal ring 20 due to shearing with the sliding surface 21. Accordingly, the sealed fluid F enters the fluid guide groove portion 17 on the downstream side in the relative rotation direction and a force acts on the fluid guide groove portion 17 to push out a part of the sealed fluid F as indicated by the arrow H1'. Furthermore, the flow of the sealed fluid F or the atmosphere A of FIG. 5 is schematically shown without specifying the relative rotation speed of the rotating seal ring 20.

On the other hand, the sealed fluid F in the reverse Rayleigh step 18' follows and moves in the backward rotation direction of the rotating seal ring 20 due to shearing with the sliding surface 21 and a positive pressure is generated at and near the terminating end 18*a*'. At this time, since the second dynamic pressure generation groove 132 is separated from the reverse Rayleigh step 18' by a long distance in the radial direction, that is, the radial length of the land portion 12*d* is long, a relatively high positive pressure is generated at and near the terminating end 18*a*'. Accordingly, the sealed fluid F flows from the terminating end 18*a*' of the reverse Rayleigh step 18' (see the arrow H3') and the inner space S1 into a space between the sliding surfaces 11 and 21.

In this way, since the sealed fluid F sucked into the fluid introduction groove 16 is supplied from the terminating end 18*a*' of the reverse Rayleigh step 18' into a space between the sliding surfaces 11 and 21 when the rotating seal ring 20 rotates backward counterclockwise relative to the stationary seal ring 10, poor lubrication can be avoided. Further, since the fluid guide groove portion 17 is provided, a large amount of the sealed fluid F can be held.

Further, since the land portion 12*b* extends in the circumferential direction between the reverse Rayleigh step 18' and the adjacent downstream Rayleigh step 18, the sealed fluid flowing from the reverse Rayleigh step 18' in the circumferential direction easily flows to the Rayleigh step 18 on the downstream side.

As described above, most of the sealed fluid F supplied from the terminating end 18*a*' of the reverse Rayleigh step 18' into a space between the sliding surfaces 11 and 21 during the backward rotation of the rotating seal ring 20 is supplied to the land portion 12*b* or the land portion 12*d* between the adjacent fluid introduction grooves 16 and the radial distance of the land portion 12*d* to the second dynamic pressure generation groove 132 is larger than that of the land portion 12*c*. That is, the first dynamic pressure generation grooves 131 are arranged in a dense state with respect to the Rayleigh step 18, whereas the second dynamic pressure generation grooves 132 are arranged in a sparse state with respect to the reverse Rayleigh step 18'. Therefore, the sealed fluid F is prevented from immediately flowing into the second dynamic pressure generation groove 132, a relatively high pressure tends to be generated at the terminating end 18*a*' of the reverse Rayleigh step 18' and the land portion 12*b* and the land portion 12*d* therearound, a sufficient gap for allowing the sealed fluid F to flow thereinto can be formed between the sliding surfaces 11 and 21, and the sliding surfaces 11 and 21 can be sufficiently lubricated.

Further, particularly the terminating ends 131*a* of the first dynamic pressure generation grooves 131 are arranged in a dense state with respect to the terminating end 18*a* of the Rayleigh step 18, whereas the terminating ends 132*a* of the second dynamic pressure generation grooves 132 are arranged in a sparse state with respect to the terminating end 18*a*' of the reverse Rayleigh step 18'. Accordingly, since the influence of the negative pressure generated at the terminating end 132*a* of the second dynamic pressure generation groove 132 is small when a positive pressure is generated at the reverse Rayleigh step 18' during backward rotation, a pressure tends to be generated at the terminating end 18*a*' of the reverse Rayleigh step 18' and the land portion 12*b* and the land portion 12*d* therearound.

Further, since a plurality of areas where the reverse Rayleigh steps 18' and the second dynamic pressure generation grooves 132 are sparse, that is, the land portions 12*b* and the land portions 12*d* are arranged in the circumferential direction of the sliding surface 11, a pressure is easily generated at the terminating ends 18*a*' of the reverse Rayleigh steps 18' at a plurality of positions in the circumferential direction of the sliding surface 11 during backward rotation and the sliding surfaces 11 and 21 can be sufficiently lubricated.

Further, since the Rayleigh step 18 is disposed on the backward rotation direction side of the reverse Rayleigh step 18', a part of the sealed fluid F flowing from the terminating end 18*a*' of the reverse Rayleigh step 18' into a space between the sliding surfaces 11 and 21 as indicated by the arrow H3' is sucked and collected from the terminating end 18*a* of the adjacent downstream Rayleigh step 18 via the land portion 12*b* as indicated by the arrow H2' and is difficult to leak to an outer space S2 which is a leakage space.

Further, since the Rayleigh step 18 and the reverse Rayleigh step 18' have a substantially T shape that shares the fluid guide groove portion 17, the sealed fluid F in the Rayleigh step on the other side when a positive pressure is generated on one side can be used in addition to the sealed fluid F in the fluid guide groove portion 17 in both forward rotation and backward rotation and a positive pressure can be efficiently generated by using a sufficient amount of the sealed fluid F.

Further, since the first dynamic pressure generation groove 131 and the second dynamic pressure generation groove 132 are spiral grooves that extend in an arc shape with an inclination from the starting ends 131*b* and 132*b* toward the inner radial side, it is possible to efficiently generate a positive pressure at the terminating ends 131*a* and 132*a* by using a fluid on the side of the outer space S2 which is the leakage space, that is, a gas.

Further, the forward fluid inlet/outlet groove includes the fluid guide groove portion 17 which communicates with the inner space S1 and the Rayleigh step 18 which serves as the dynamic pressure generation portion circumferentially extending concentrically with the stationary seal ring 10 from the outer radial side of the fluid guide groove portion 17 in the forward rotation direction of the rotating seal ring 20 and the backward fluid inlet/outlet groove includes the fluid guide groove portion 17 which communicates with the inner space S1 and the reverse Rayleigh step 18' which serves as the dynamic pressure generation portion circumferentially extending concentrically with the stationary seal ring 10 from the outer radial side of the fluid guide groove portion 17 in the backward rotation direction of the rotating seal ring 20. Then, since the Rayleigh step 18 and the reverse Rayleigh step 18' extend in the relative forward rotation direction or the relative backward rotation direction, most of the sealed fluid F flows out from the terminating end 18*a* of the Rayleigh step 18 or the terminating end 18*a'* of the reverse Rayleigh step 18' in the circumferential direction, that is, toward the land portion 12*b* during forward rotation and during backward rotation and hence the sealed fluid is difficult to be drawn from the terminating end 132*a* of the second dynamic pressure generation groove 132.

Second Embodiment

Figure 6:
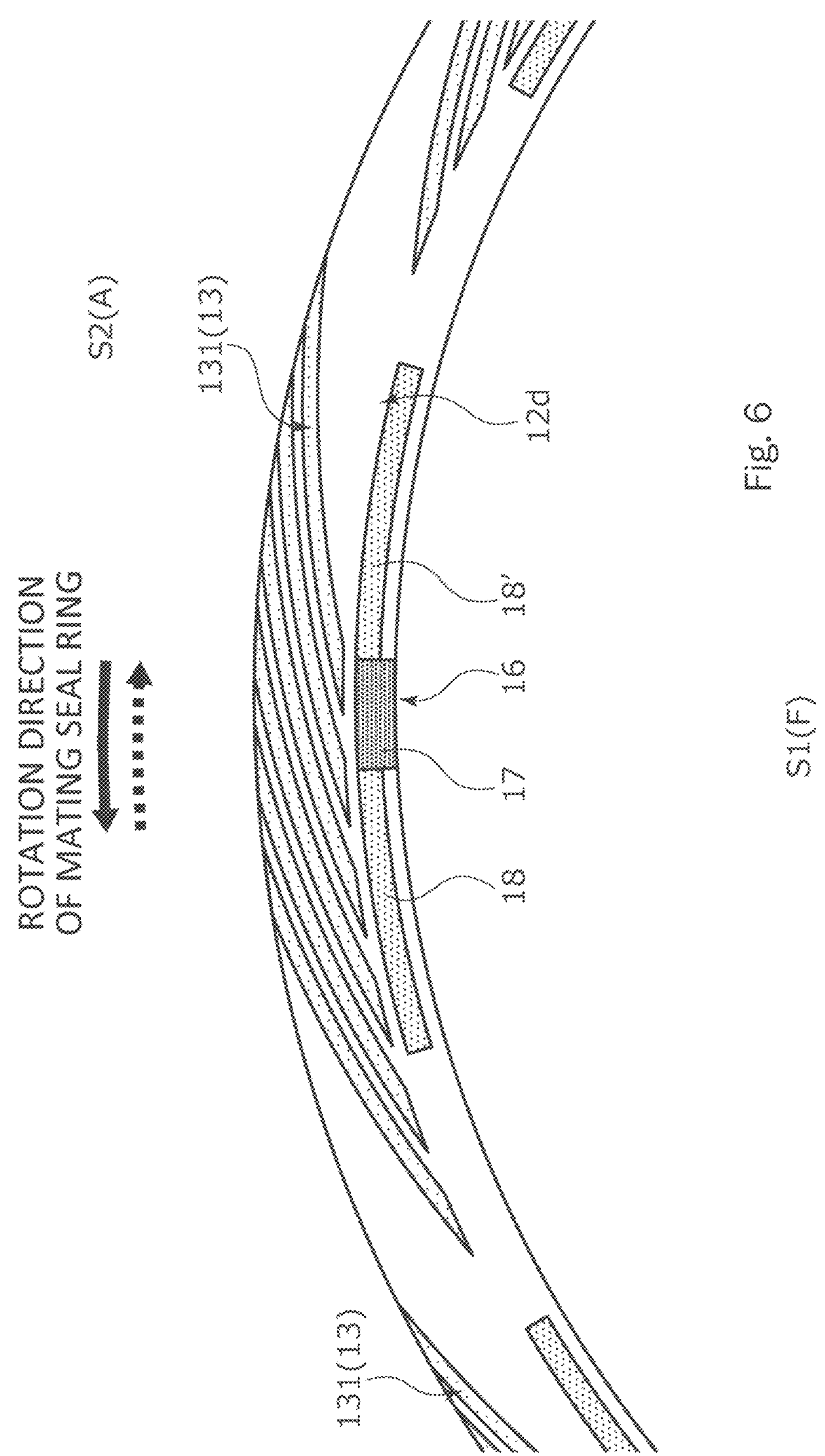
FIG. 6 is an enlarged view of a sliding surface of a stationary seal ring included in a sliding component according to a second embodiment of the present invention when viewed from the axial direction.

Next, a sliding component according to a second embodiment of the present invention will be described with reference to FIG. 6. Furthermore, description of the same configuration and overlapping configuration as in the first embodiment will be omitted.

In the first embodiment described above, a configuration has been described in which the radial length of the second dynamic pressure generation groove 132 is shorter than that of the first dynamic pressure generation groove 131 so that the dynamic pressure generation grooves 13 are arranged in a dense state with respect to the Rayleigh step 18, but are arranged in a sparse state with respect to the reverse Rayleigh step 18', but in the sliding component of this second embodiment, the dynamic pressure generation groove facing the reverse Rayleigh step 18' in the extending direction is omitted. That is, the dynamic pressure generation groove 13 of this second embodiment does not extend toward the land portion 12*d* in the extending direction and the dynamic pressure generation grooves 13 are in a sparse state with respect to the reverse Rayleigh step 18'.

Accordingly, although the positive pressure generation capacity of the entire dynamic pressure generation groove 13 during forward rotation is slightly reduced, it is possible to further suppress the leakage of the sealed fluid F from the dynamic pressure generation groove facing the reverse Rayleigh step 18' in the extending direction.

Third Embodiment

Figure 7:
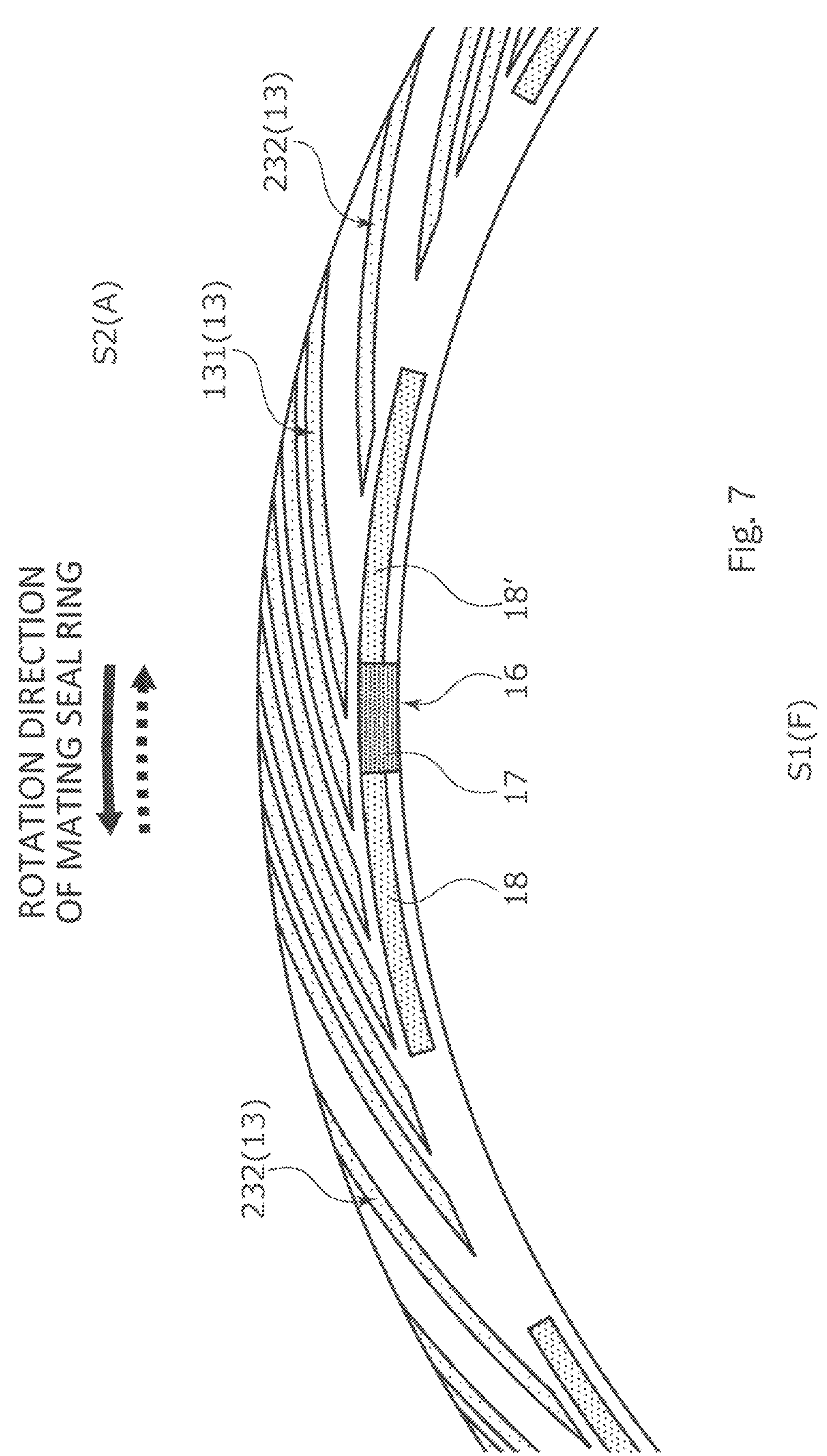
FIG. 7 is an enlarged view of a sliding surface of a stationary seal ring included in a sliding component according to a third embodiment of the present invention when viewed from the axial direction.

Next, a sliding component according to a third embodiment of the present invention will be described with reference to FIG. 7. Furthermore, description of the same configuration and overlapping configuration as in the first embodiment will be omitted.

In the first embodiment described above, a configuration has been described in which the radial length of the second dynamic pressure generation groove 132 is shorter than that of the first dynamic pressure generation groove 131 so that the dynamic pressure generation grooves 13 are arranged in a dense state with respect to the Rayleigh step 18, but are arranged in a sparse state with respect to the reverse Rayleigh step 18', but in the sliding component of this third embodiment, the first dynamic pressure generation groove 131 and a second dynamic pressure generation groove 232 have the same radial length and the number of the second dynamic pressure generation grooves 232 facing the reverse Rayleigh steps 18' in the extending direction is smaller than the number of the first dynamic pressure generation grooves 131 facing the Rayleigh step 18 in the extending direction so that the dynamic pressure generation grooves 13 are arranged in a sparse state with respect to the reverse Rayleigh step 18'.

Accordingly, a part of the sealed fluid F tends to be sucked from the second dynamic pressure generation groove 232 facing the reverse Rayleigh step 18' in the extending direction during backward rotation, but since the second dynamic pressure generation groove 232 extends to the inner space S1 which is the sealed fluid space and a gas-liquid interface is located on the sealed fluid space side during forward rotation, the sealed fluid F is difficult to leak.

Fourth Embodiment

Figure 8:
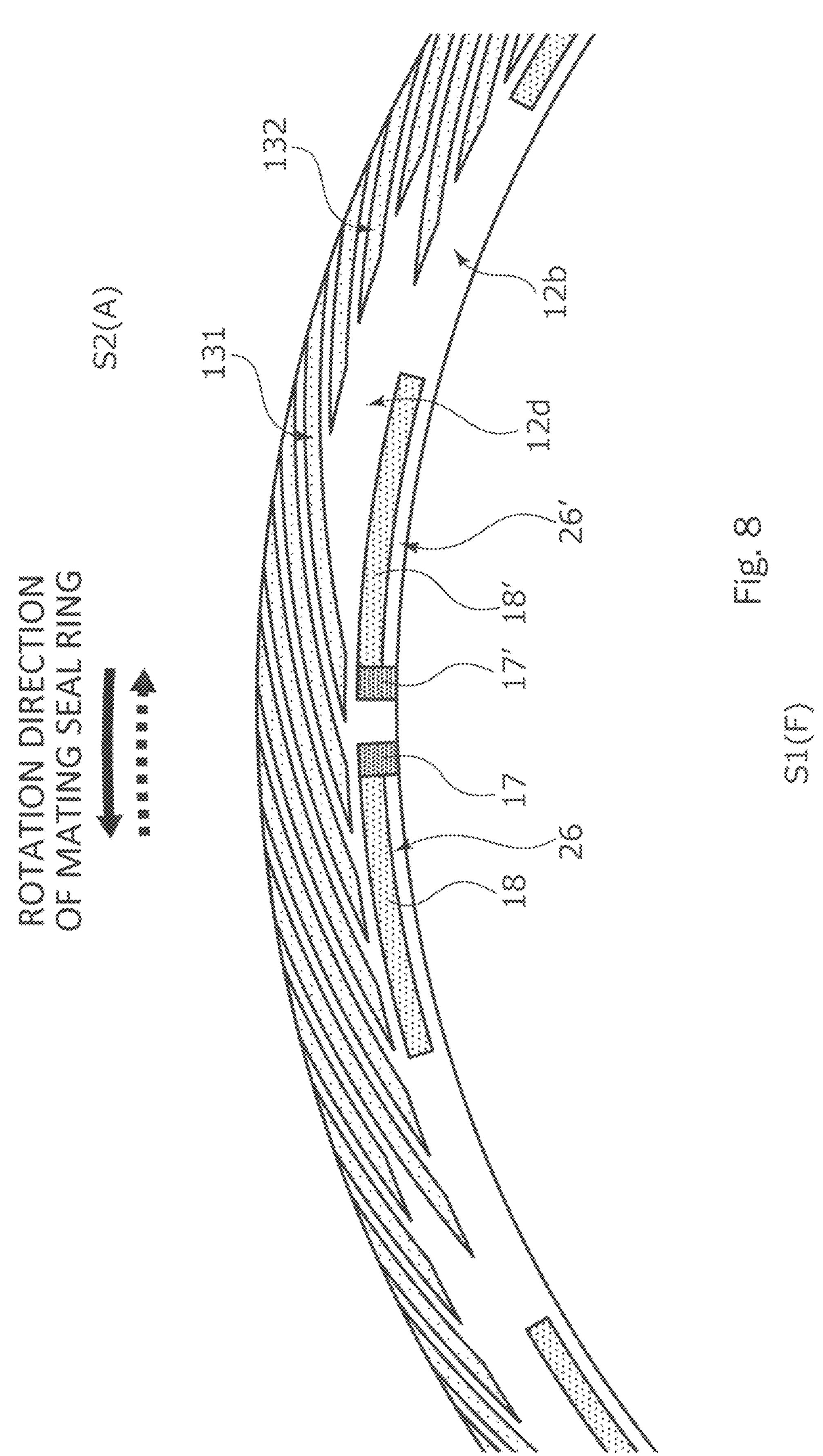
FIG. 8 is an enlarged view of a sliding surface of a stationary seal ring of a fourth embodiment of the present invention when viewed from the axial direction.

Next, a sliding component according to a fourth embodiment of the present invention will be described with reference to FIG. 8. Furthermore, description of the same configuration and overlapping configuration as in the first embodiment will be omitted.

In the first embodiment described above, the Rayleigh step 18 and the reverse Rayleigh step 18' are integrally formed as the fluid introduction groove 16 having a substantially T shape that shares the fluid guide groove portion 17, but in the sliding component of this fourth embodiment, the Rayleigh step 18 and the fluid guide groove portion 17 constitute a forward fluid inlet/outlet groove 26, the reverse Rayleigh step 18' and the fluid guide groove portion 17' constitute a backward fluid inlet/outlet groove 26', and these are arranged to separate the fluid guide groove portions 17 and 17' from each other in the circumferential direction.

Accordingly, since the forward fluid inlet/outlet groove 26 and the backward fluid inlet/outlet groove 26' can be insulated from each other, the movement of the sealed fluid F in one direction hardly influences the other in both forward rotation and backward rotation. Accordingly, it is easy to design to obtain the necessary positive pressure in each case.

Fifth Embodiment

Next, a sliding component according to a fifth embodiment of the present invention will be described with reference to FIG. 9. Furthermore, description of the same configuration and overlapping configuration as in the first embodiment will be omitted.

A dynamic pressure generation groove 23 is opened and communicated with the leakage space, is inclined downstream while facing the sealed fluid space side, and is recessed in a straight line up to a terminating end 23*a*. The terminating ends 23*a* of the dynamic pressure generation grooves 23 are provided in parallel so that the radial positions gradually change in the circumferential direction and are arranged on a smooth and continuous sinusoidal virtual curve in the circumferential direction. Furthermore, although not limited to this embodiment and not particularly illustrated, the virtual curve on which the terminating ends 23*a* are arranged does not have to have periodicity like a sine wave shape.

In the dynamic pressure generation groove 23, one dynamic pressure generation groove group includes dynamic pressure generation grooves 23A to 23L, the dynamic pressure generation groove groups are arranged at equal intervals in the circumferential direction, and one fluid introduction groove 16 is disposed for each dynamic pressure generation groove group.

Figure 9:
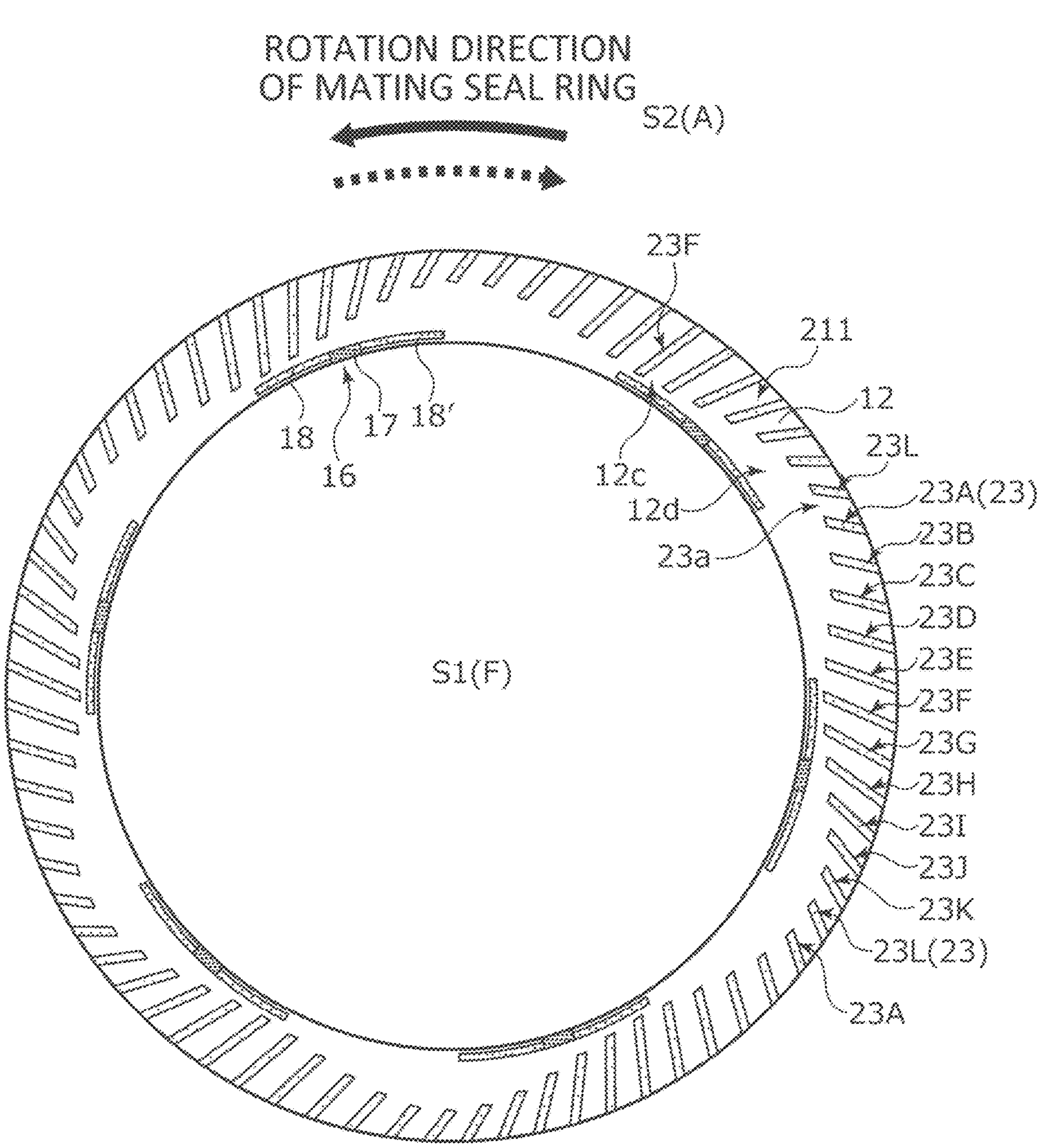
FIG. 9 is a diagram of a sliding surface of a stationary seal ring included in a sliding component according to a fifth embodiment of the present invention when viewed from the axial direction.

As shown in FIG. 9, the reverse Rayleigh step 18' is located in the extending direction of the dynamic pressure generation groove 23L of which the terminating end 23*a* is closest to the leakage space side (here, the outer radial side), and the land portion 12*d* is located in the extending direction of the dynamic pressure generation groove 23A of which the terminating end 23*a* is closer to the sealed fluid space side (here, the inner radial side) than the dynamic pressure generation groove 23L. Then, the Rayleigh step 18 is located via the land portion 12*c* in the extending direction of the dynamic pressure generation grooves 23F to 23H of which the terminating ends 23*a* are closer to the sealed fluid space side (here, the inner radial side). In this way, the dynamic pressure generation grooves 23 are arranged in a dense state so that the terminating ends 23*a* are close to the Rayleigh step 18 and the fluid guide groove portion 17 via the land portion 12*c* and in contrast, the dynamic pressure generation grooves are arranged in a sparse state so that the terminating ends 23*a* are away from the reverse Rayleigh step 18' via the land portion 12*d*.

Accordingly, since the plurality of terminating ends 23*a* are arranged on a sinusoidal virtual curve, a positive pressure is generated at different radial positions along the circumferential direction in the sliding surface 211 during the forward rotation of the rotating seal ring 20 and the pressure gradient in the radial direction on the sliding surface 211 becomes smaller. Accordingly, a fluid film is easily formed uniformly over a wide area of the sliding surface 211. Therefore, the lubricity between the sliding surfaces 211 and 21 becomes satisfactory. In addition, since the dynamic pressure generation grooves 23 are in a sparse state so that the terminating end 23*a* is away from the reverse Rayleigh step 18' during backward rotation, a pressure is easily generated at the land portion 12*d*.

Furthermore, in this fifth embodiment, the reverse Rayleigh step 18' is located in the extending direction of the dynamic pressure generation groove 23L of which the terminating end 23*a* is closest to the sealed fluid space side (here, the outer radial side), and the Rayleigh step 18 is located in the extending direction of the dynamic pressure generation grooves 23F to 23H of which the terminating ends 23*a* are relatively close to the leakage space side (here, the inner radial side). However, the present invention is not limited thereto, and when the dynamic pressure generation grooves are arranged in a dense state with respect to the Rayleigh step 18 and are arranged in a sparse state with respect to the reverse Rayleigh step 18', the Rayleigh step 18 or the reverse Rayleigh step 18' may be located in the extending direction of any dynamic pressure generation groove 23 of the dynamic pressure generation grooves 23A to 23L.

Sixth Embodiment

Figure 10:
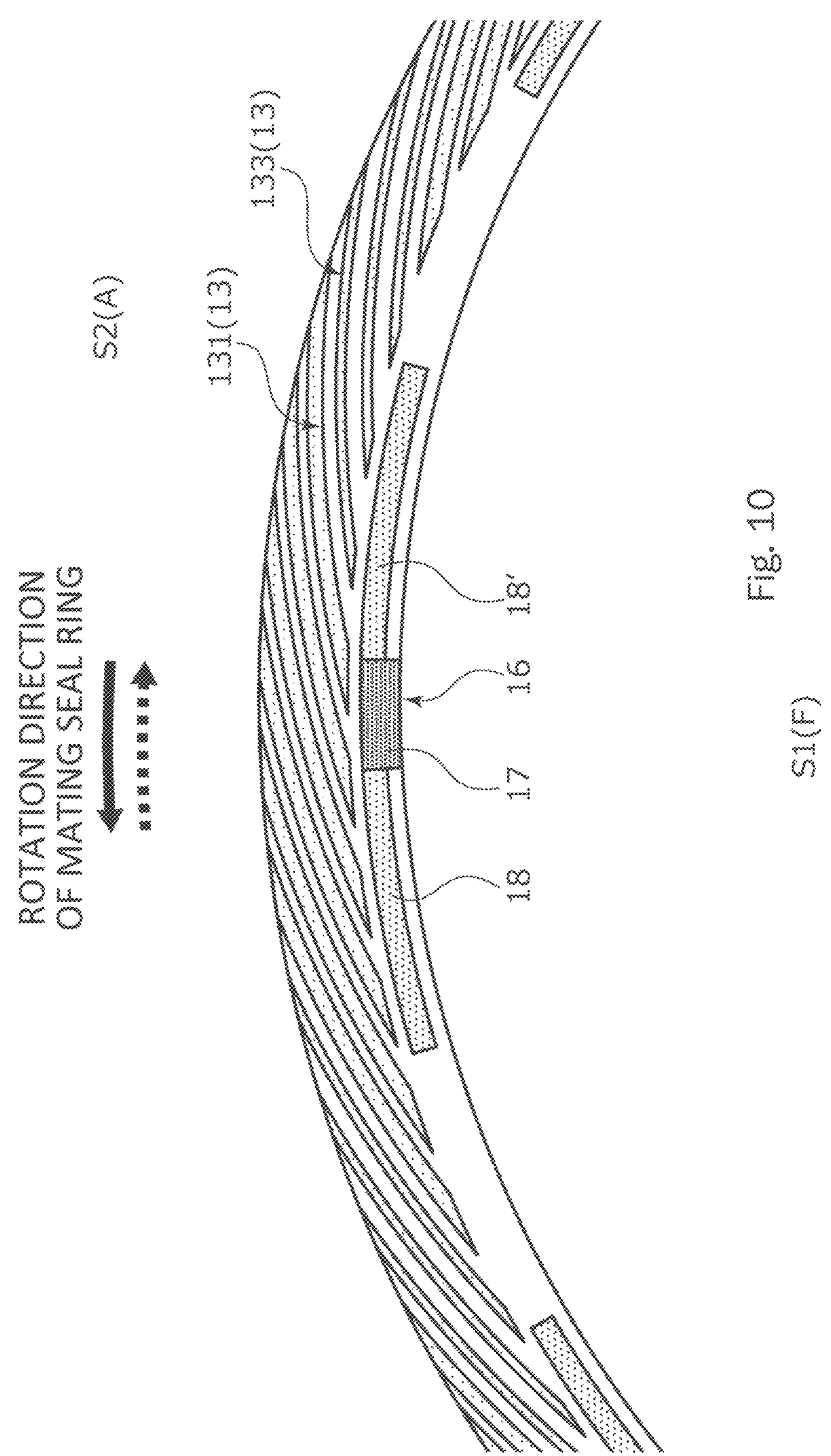
FIG. 10 is a diagram of a sliding surface of a stationary seal ring included in a sliding component according to a sixth embodiment of the present invention when viewed from the axial direction.

Next, a sliding component according to a sixth embodiment of the present invention will be described with reference to FIG. 10. Furthermore, description of the same configuration and overlapping configuration as in the first embodiment will be omitted.

In the sliding component of this sixth embodiment, the first dynamic pressure generation groove 131 and a second dynamic pressure generation groove 133 have the same radial length, and the groove width of the second dynamic pressure generation groove 133 facing the reverse Rayleigh step 18' in the extending direction is shorter than that of the first dynamic pressure generation groove 131 facing the Rayleigh step 18 in the extending direction. In this way, the dynamic pressure generation grooves 13 are arranged in a sparse state with respect to the reverse Rayleigh step 18'.

Accordingly, a part of the sealed fluid F is sucked from the second dynamic pressure generation groove 133 facing the reverse Rayleigh step 18' in the extending direction during the backward rotation, but the suction amount is small. Further, since the second dynamic pressure generation groove 133 extends to the inner space S1 which is the sealed fluid space, a gas-liquid interface is located on the sealed fluid space side during the forward rotation and the sealed fluid F is difficult to leak.

Seventh Embodiment

Figure 11:
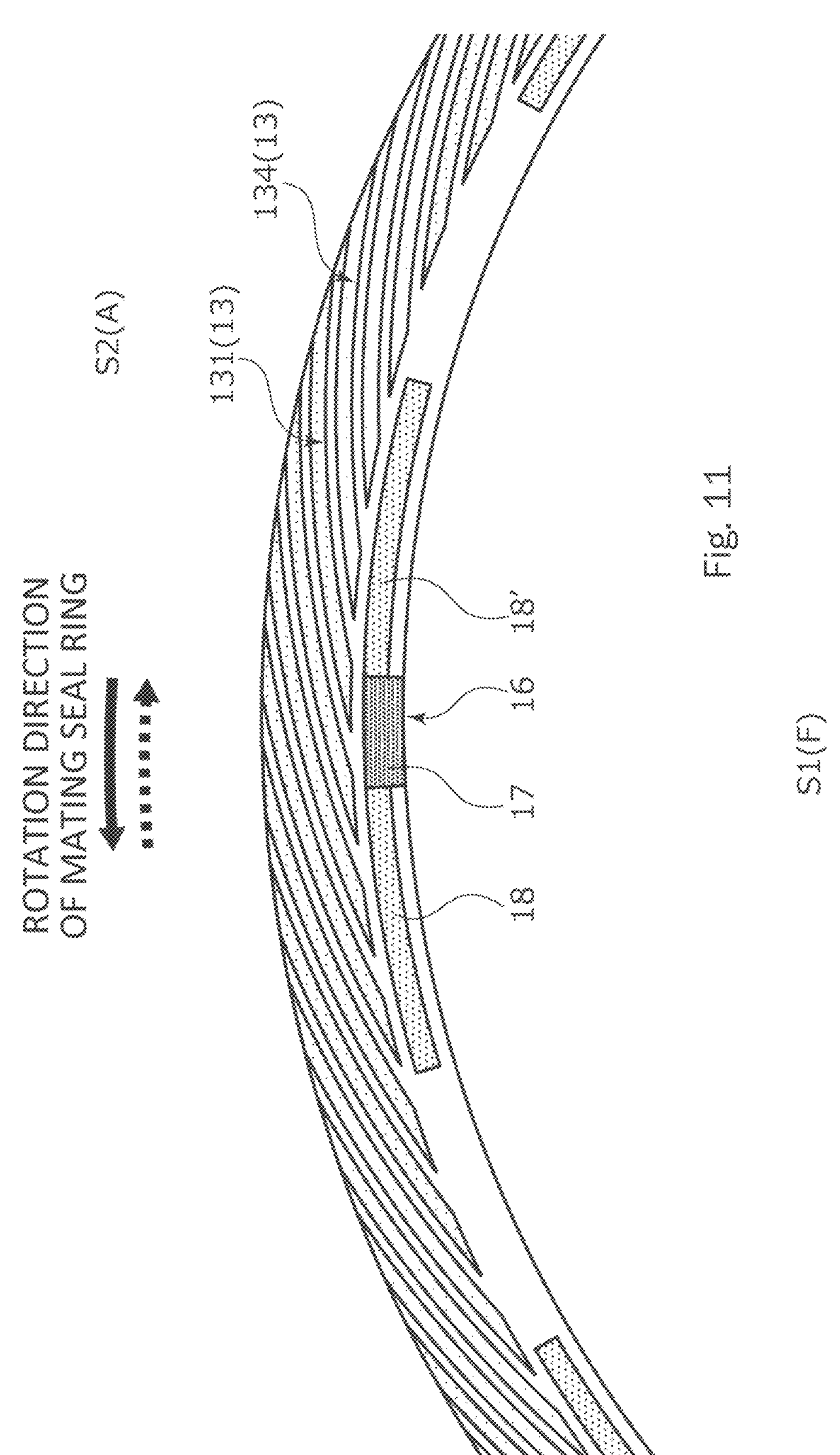
FIG. 11 is a diagram of a sliding surface of a stationary seal ring included in a sliding component according to a seventh embodiment of the present invention when viewed from the axial direction.

Next, a sliding component according to a seventh embodiment of the present invention will be described with reference to FIG. 11. Furthermore, description of the same configuration and overlapping configuration as in the first embodiment will be omitted.

In the sliding component of this seventh embodiment, the first dynamic pressure generation groove 131 and a second dynamic pressure generation groove 134 have the same radial length, and the depth dimension of the second dynamic pressure generation groove 134 facing the reverse Rayleigh step 18' in the extending direction is shorter than that of the first dynamic pressure generation groove 131 facing the Rayleigh step 18 in the extending direction. In this way, the dynamic pressure generation grooves 13 are arranged in a sparse state with respect to the reverse Rayleigh step 18'.

Accordingly, a part of the sealed fluid F is sucked from the second dynamic pressure generation groove 134 facing the reverse Rayleigh step 18' in the extending direction during backward rotation, but since the second dynamic pressure generation groove 134 has a smaller absolute value of the negative pressure generated at a predetermined rotation speed than the first dynamic pressure generation groove 131, the influence on the positive pressure generated at and near the terminating end 18*a*' of the reverse Rayleigh step 18' is small. Further, since the second dynamic pressure generation groove 134 extends to the inner space S1 which is the sealed fluid space, a gas-liquid interface is located on the sealed fluid space side during forward rotation and the sealed fluid F is difficult to leak.

Although embodiments of the present invention have been described above with reference to the drawings, the specific configuration is not limited to these embodiments and changes and additions within the scope of the present invention are included in the present invention.

For example, in the first to seventh embodiments, although a mechanical seal for automobiles has been described as an example of the sliding component, other mechanical seals such as those for general industrial machinery may also be used. Further, the present invention is not limited to the mechanical seal, and may be a sliding component other than a mechanical seal, such as a sliding bearing.

Further, in the first to seventh embodiments, although an example has been described in which the dynamic pressure generation groove and the fluid introduction groove are provided in the stationary seal ring, the dynamic pressure generation groove and the fluid introduction groove may be provided in the rotating seal ring.

Further, in the first to seventh embodiments, although it has been described that the sealed fluid side is a high pressure side and the leakage side is a low pressure side, the sealed fluid side may be a low pressure side, the leakage side may be a high pressure side, and the sealed fluid side and the leakage side may have substantially the same pressure.

Figure 12:
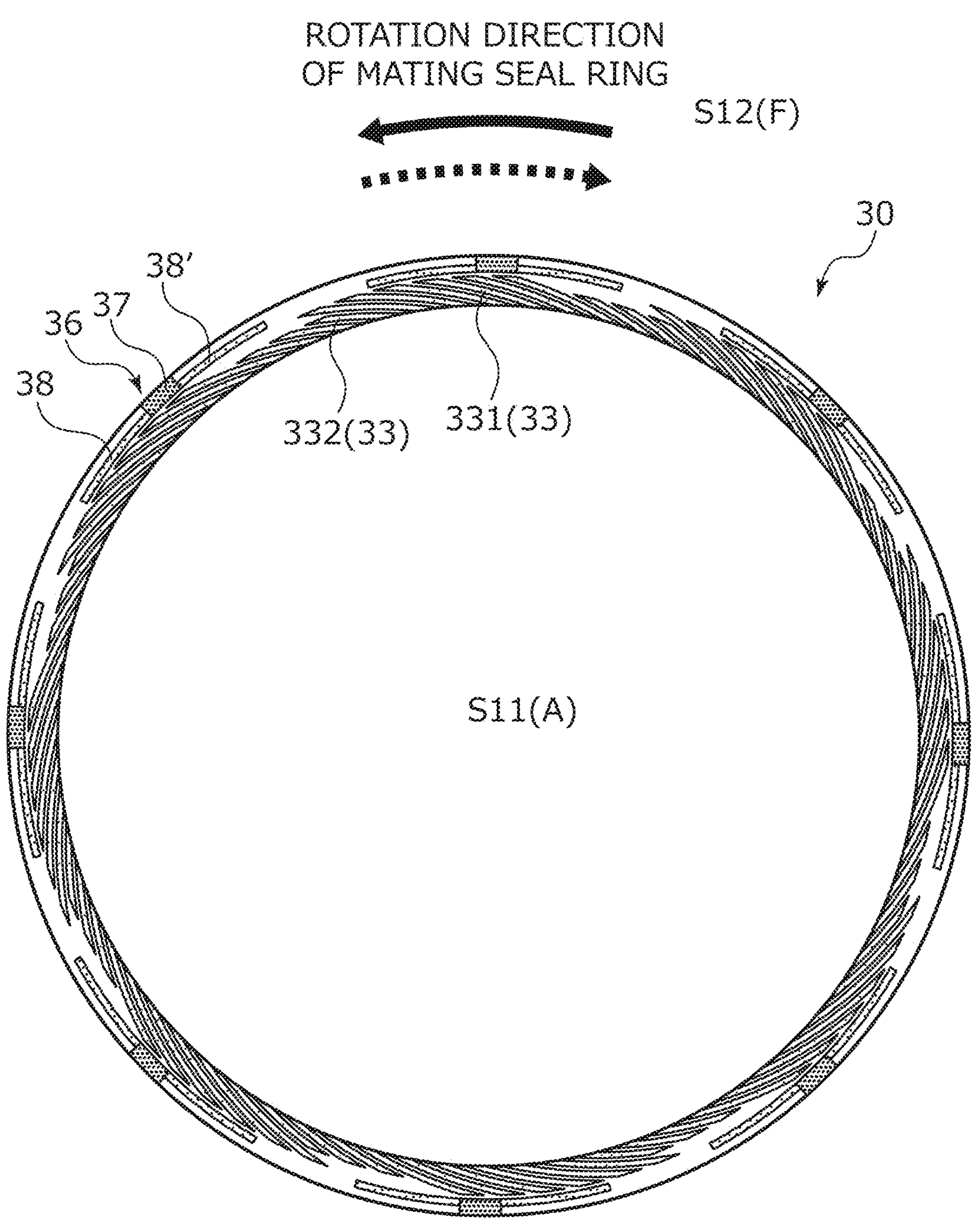
FIG. 12 is a diagram of a sliding surface of a stationary seal ring of a modified example of the first embodiment of the present invention when viewed from the axial direction.

Further, in the first to seventh embodiments, although it has been described that the mechanical seal having a sliding component is of an outside type, the present invention may also be applied to an inside type that seals a fluid trying to leak from the outer periphery of the sliding surface toward the inner periphery. When the inside type is adopted, for example, as in a sliding component 30 shown in FIG. 12, a first dynamic pressure generation groove 331 and a second dynamic pressure generation groove 332 corresponding to a dynamic pressure generation groove 33 may be provided on the inner radial side, that is, an inner space S11 corresponding to a leakage space and a fluid introduction groove 36 including a Rayleigh step 38, a reverse Rayleigh step 38', and a fluid guide groove portion 37 may be provided on the outer radial side, that is, an outer space S12 corresponding to a sealed fluid space.

Further, in the first to seventh embodiments, although it has been described that the dynamic pressure generation groove communicates with the leakage space, the present invention is not limited thereto and the dynamic pressure generation groove may not communicate with the leakage space if a dynamic pressure can be generated.

Further, in the first to seventh embodiments, although it has been described that the fluid introduction groove communicates with the sealed fluid space, the present invention is not limited thereto and the fluid introduction groove may not communicate with the sealed fluid space if the sealed fluid can be stored. For example, a dimple or the like may be used.

Further, in the first to seventh embodiments, although an example has been described in which the fluid introduction groove has a Rayleigh step, the present invention is not limited thereto. For example, a portion of the Rayleigh step may be an inclined groove that extends in the radial direction with an inclination in the circumferential direction if a positive pressure can be generated during forward rotation and backward rotation.

Further, in the first to seventh embodiments, an example has been described in which a plurality of fluid introduction grooves are provided in the circumferential direction, but at least one fluid introduction groove may be provided.

Further, in the first to seventh embodiments, although it has been described that the sealed fluid is a high-pressure liquid, the present invention is not limited thereto. For example, the sealed fluid may be a gas or low-pressure liquid, or may be a mist mixture of liquid and gas.

Further, in the first to seventh embodiments, although it has been described that the leakage side fluid is atmosphere which is a low-pressure gas, the present invention is not limited thereto. For example, the leakage side fluid may be a liquid or high-pressure gas, or may be a mist mixture of liquid and gas.

REFERENCE SIGNS LIST

10 Stationary seal ring (sliding ring)
11, 21 Sliding surface
12*a* to 12*d* Land portion
13 Dynamic pressure generation groove (forward dynamic pressure generation groove)
16 Fluid introduction groove
17 Fluid guide groove portion (forward fluid inlet/outlet groove. backward fluid inlet/outlet groove)
18 Rayleigh step (forward fluid inlet/outlet groove)
18' Reverse Rayleigh step (backward fluid inlet/outlet groove)
18*a*, 18*a'* Terminating end
20 Rotating seal ring
23 Dynamic pressure generation groove
23A to 23L Dynamic pressure generation groove
23*a* Terminating end
26' Backward fluid inlet/outlet groove
26 Forward fluid inlet/outlet groove
131 First dynamic pressure generation groove
131*a* Terminating end
132 Second dynamic pressure generation groove
132*a* Terminating end
133 Second dynamic pressure generation groove
134 Second dynamic pressure generation groove
232 Second dynamic pressure generation groove
F Sealed fluid
S1 Inner space (sealed fluid space)
S2 Outer space (leakage space)
S11 Inner space (leakage space)
S12 Outer space (sealed fluid space)

The invention claimed is:

1. A sliding component comprising a pair of sliding rings having sliding surfaces rotatable relative to each other to partition a sealed fluid space and a leakage space, wherein at least one of the sliding surfaces is provided with a plurality of forward dynamic pressure generation grooves each of which is configured to communicate with the leakage space, a forward fluid inlet/outlet groove which is separated from the forward dynamic pressure generation grooves by a first land portion and is configured to communicate with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparser state with respect to the backward fluid inlet/outlet groove than with respect to the forward fluid inlet/outlet groove, and wherein the sparser state is configured such that part of the forward dynamic pressure generation grooves close to the backward fluid inlet/outlet groove have shorter radial lengths than part of the forward dynamic pressure generation grooves close to the forward fluid inlet/outlet groove.

2. The sliding component according to claim 1, wherein terminating ends of the forward dynamic pressure generation grooves are disposed in a sparser state with respect to a terminating end of the backward fluid inlet/outlet groove than with respect to a terminating end of the forward fluid inlet/outlet groove.

3. The sliding component according to claim 1, wherein the sparser state is configured such that part of the forward dynamic pressure generation grooves close to the backward fluid inlet/outlet groove have a smaller total volume than a total volume of part of the forward dynamic pressure generation grooves close to the forward fluid inlet/outlet groove.

4. The sliding component according to claim 1, wherein a plurality of sparse areas showing the sparser state are arranged in a circumferential direction of the one of the sliding surfaces.

5. The sliding component according to claim 1, wherein each of the forward dynamic pressure generation grooves is a spiral groove extending from a starting end in an arc shape with an inclination with respect to a radial direction, the forward fluid inlet/outlet groove includes a fluid guide groove portion configured to communicate with the sealed fluid space and a Rayleigh step extending in a relative forward rotation direction, and the backward fluid inlet/outlet groove includes a fluid guide groove portion configured to communicate with the sealed fluid space and a reverse Rayleigh step extending in a relative backward rotation direction.

6. The sliding component according to claim 5, wherein the forward fluid inlet/outlet groove and the backward fluid inlet/outlet groove as a whole have a substantially T shape and share a groove as the fluid guide groove portions thereof.

7. The sliding component according to claim 1, wherein the forward fluid inlet/outlet groove is disposed on a relative backward rotation direction side of the backward fluid inlet/outlet groove.

8. The sliding component according to claim 2, wherein each of the forward dynamic pressure generation grooves is a spiral groove extending from a starting end in an arc shape with an inclination with respect to a radial direction, the forward fluid inlet/outlet groove includes a fluid guide groove portion configured to communicate with the sealed fluid space and a Rayleigh step extending in a relative forward rotation direction, and the backward fluid inlet/outlet groove includes a fluid guide groove portion configured to communicate with the sealed fluid space and a reverse Rayleigh step extending in a relative backward rotation direction.

9. The sliding component according to claim 8, wherein the forward fluid inlet/outlet groove and the backward fluid inlet/outlet groove as a whole have a substantially T shape and share a groove as the fluid guide groove portions thereof.

10. The sliding component according to claim 3, wherein each of the forward dynamic pressure generation grooves is a spiral groove extending from a starting end in an arc shape with an inclination with respect to a radial direction, the forward fluid inlet/outlet groove includes a fluid guide groove portion configured to communicate with the sealed fluid space and a Rayleigh step extending in a relative forward rotation direction, and the backward fluid inlet/outlet groove includes a fluid guide groove portion configured to communicate with the sealed fluid space and a reverse Rayleigh step extending in a relative backward rotation direction.

11. The sliding component according to claim 10, wherein the forward fluid inlet/outlet groove and the backward fluid inlet/outlet groove as a whole have a substantially T shape and share a groove as the fluid guide groove portions thereof.

12. The sliding component according to claim 4, wherein each of the forward dynamic pressure generation grooves is a spiral groove extending from a starting end in an arc shape with an inclination with respect to a radial direction, the forward fluid inlet/outlet groove includes a fluid guide groove portion configured to communicate with the sealed fluid space and a Rayleigh step extending in a relative forward rotation direction, and the backward fluid inlet/outlet groove includes a fluid guide groove portion configured to communicate with the sealed fluid space and a reverse Rayleigh step extending in a relative backward rotation direction.

13. The sliding component according to claim 12, wherein the forward fluid inlet/outlet groove and the backward fluid inlet/outlet groove as a whole have a substantially T shape and share a groove as the fluid guide groove portions thereof.

14. The sliding component according to claim 2, wherein the forward fluid inlet/outlet groove is disposed on a relative backward rotation direction side of the backward fluid inlet/outlet groove.

15. The sliding component according to claim 3, wherein the forward fluid inlet/outlet groove is disposed on a relative backward rotation direction side of the backward fluid inlet/outlet groove.

16. The sliding component according to claim 4, wherein the forward fluid inlet/outlet groove is disposed on a relative backward rotation direction side of the backward fluid inlet/outlet groove.

17. A sliding component comprising a pair of sliding rings having sliding surfaces rotatable relative to each other to partition a sealed fluid space and a leakage space, wherein at least one of the sliding surfaces is provided with a plurality of forward dynamic pressure generation grooves each of which is configured to communicate with the leakage space, a forward fluid inlet/outlet groove which is separated from the forward dynamic pressure generation grooves by a first land portion and is configured to communicate with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparser state with respect to the backward fluid inlet/outlet groove than with respect to the forward fluid inlet/outlet groove, and wherein the sparser state is configured such that the forward dynamic pressure generation grooves are disposed to be directed to only the forward fluid inlet/outlet groove.

18. A sliding component comprising a pair of sliding rings having sliding surfaces rotatable relative to each other to partition a sealed fluid space and a leakage space, wherein at least one of the sliding surfaces is provided with a plurality of forward dynamic pressure generation grooves each of which is configured to communicate with the leakage space, a forward fluid inlet/outlet groove which is separated from the forward dynamic pressure generation grooves by a first land portion and is configured to communicate with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparser state with respect to the backward fluid inlet/outlet groove than with respect to the forward fluid inlet/outlet groove, and wherein the sparser state is configured such that part of the forward dynamic pressure generation grooves close to the backward fluid inlet/outlet groove have a larger arrangement period than part of the forward dynamic pressure generation grooves close to the forward fluid inlet/outlet groove.

19. A sliding component comprising a pair of sliding rings having sliding surfaces rotatable relative to each other to partition a sealed fluid space and a leakage space, wherein at least one of the sliding surfaces is provided with a plurality of forward dynamic pressure generation grooves each of which is configured to communicate with the leakage space, a forward fluid inlet/outlet groove which is separated from the forward dynamic pressure generation grooves by a first land portion and is configured to communicate with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparser state with respect to the backward fluid inlet/outlet groove than with respect to the forward fluid inlet/outlet groove, and wherein the sparser state is configured such that land portions each disposed between adjacent two of part of the forward dynamic pressure generation grooves close to the backward fluid inlet/outlet groove have larger circumferential widths than land portions each disposed between adjacent two of part of the forward dynamic pressure generation grooves close to the forward fluid inlet/outlet groove.

20. A sliding component comprising a pair of sliding rings having sliding surfaces rotatable relative to each other to partition a sealed fluid space and a leakage space, wherein at least one of the sliding surfaces is provided with a plurality of forward dynamic pressure generation grooves each of which is configured to communicate with the leakage space, a forward fluid inlet/outlet groove which is separated from the forward dynamic pressure generation grooves by a first land portion and is configured to communicate with the sealed fluid space, and a backward fluid inlet/outlet groove which is separated from the forward dynamic pressure generation grooves by a second land portion and communicates with the sealed fluid space, and wherein the forward dynamic pressure generation grooves are disposed in a sparser state with respect to the backward fluid inlet/outlet groove than with respect to the forward fluid inlet/outlet groove, and wherein the sparser state is configured such that part of the forward dynamic pressure generation grooves close to the backward fluid inlet/outlet groove have smaller depths than part of the forward dynamic pressure generation grooves close to the forward fluid inlet/outlet groove.

* * * * *